US012192871B2

(12) United States Patent
Edge et al.

(10) Patent No.: US 12,192,871 B2
(45) Date of Patent: Jan. 7, 2025

(54) TECHNIQUES FOR BROADCASTING EMERGENCY INFORMATION TO UNMANNED AERIAL VEHICLES IN A WIRELESS COMMUNICATION SYSTEM

(71) Applicant: QUALCOMM Incorporated, San Diego, CA (US)

(72) Inventors: Stephen William Edge, Escondido, CA (US); Harish Singh Bisht, Lalkuan (IN); Rajesh Kotha, Hyderabad (IN); Sandeep Lnu, Gurgaon (IN); Vishnu Vardhan Reddy Mende, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 17/477,389

(22) Filed: Sep. 16, 2021

(65) Prior Publication Data

US 2022/0394449 A1    Dec. 8, 2022

(30) Foreign Application Priority Data

Jun. 6, 2021    (IN) .............................. 202141025100

(51) Int. Cl.
*H04W 4/00*    (2018.01)
*H04W 4/029*    (2018.01)
(Continued)

(52) U.S. Cl.
CPC ............. *H04W 4/90* (2018.02); *H04W 4/029* (2018.02); *H04W 4/14* (2013.01); *H04W 72/23* (2023.01); *H04W 84/06* (2013.01)

(58) Field of Classification Search
CPC ......... H04W 4/90; H04W 4/029; H04W 4/14; H04W 72/23; H04W 84/06; H04W 4/021; H04W 76/50
See application file for complete search history.

(56) References Cited

U.S. PATENT DOCUMENTS

2018/0061249 A1* 3/2018 Cui ..................... G08G 5/0043
2020/0077415 A1   3/2020 Tang et al.
(Continued)

FOREIGN PATENT DOCUMENTS

CA            3011737 A1 *  2/2019  ........... B64C 39/024

OTHER PUBLICATIONS

International Search Report and Written Opinion—PCT/US2022/031824—ISA/EPO—Sep. 14, 2022.

*Primary Examiner* — Omoniyi Obayanju
(74) *Attorney, Agent, or Firm* — Holland & Hart LLP

(57) ABSTRACT

The described techniques provide for a wireless base station to receive emergency instructions for aerial UEs from a third party system. The base station may generate a broadcast message including the emergency instructions, associated parameters, and an indication that the broadcast message is for aerial UEs. The base station may transmit a short message indicating aerial UEs to monitor for the broadcast message and may transmit the broadcast message accordingly. An aerial UE may receive the short message and the broadcast message and, based on the indication that the broadcast message is for aerial UEs, may decode emergency information of the broadcast message to obtain the emergency instructions and associated parameters. The aerial UE may perform one or more actions based on the decoded emergency instructions.

26 Claims, 18 Drawing Sheets

(51) Int. Cl.
    *H04W 4/14*     (2009.01)
    *H04W 4/90*     (2018.01)
    *H04W 72/23*     (2023.01)
    *H04W 84/06*     (2009.01)

(56) References Cited

U.S. PATENT DOCUMENTS

2020/0413369 A1   12/2020  Wei et al.
2020/0413442 A1   12/2020  Balasubramanian et al.

* cited by examiner

TECHNIQUES FOR BROADCASTING EMERGENCY INFORMATION TO UNMANNED AERIAL VEHICLES IN A WIRELESS COMMUNICATION SYSTEM

CROSS REFERENCE

The present application for patent claims the benefit of India Provisional Patent Application No. 2021/41025100 by EDGE et al., entitled "TECHNIQUES FOR BROADCASTING EMERGENCY INFORMATION TO UNMANNED AERIAL VEHICLES IN A WIRELESS COMMUNICATION SYSTEM," filed Jun. 6, 2021, assigned to the assignee hereof, and expressly incorporated by reference herein.

FIELD OF TECHNOLOGY

The following relates to wireless communication, including techniques for broadcasting emergency information to unmanned aerial vehicles in a wireless communication system.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support aerial UEs which may be capable of flying or maneuvering through the air (e.g., unmanned aerial vehicles (UAVs)). In some examples, the aerial UEs may communicate with base stations or other network entities via a radio access network (RAN). It may be beneficial to implement a method for communicating emergency information to aerial UEs using the RAN.

SUMMARY

The described techniques relate to improved methods, systems, devices, and apparatuses that support techniques for broadcasting emergency information to unmanned aerial vehicles in a wireless communication system. Generally, the described techniques provide for a base station to receive emergency instructions for aerial user equipment (UEs), such as unmanned aerial vehicles (UAVs) from an authorized third party system. The base station may generate a broadcast message including the emergency instructions, associated parameters, and an indication that broadcast message is for aerial UEs. The base station may, in some examples, transmit a short message indicating aerial UEs to monitor for the broadcast message and may transmit the broadcast message accordingly. An aerial UE may receive the short message and the broadcast message and may decode emergency information of the broadcast message to obtain the emergency instructions and associated parameters. The aerial UE may perform one or more actions based on the decoded emergency instructions. Implementing aspects of the present disclosure may enable communication of emergency instructions to aerial UEs.

A method for wireless communication at an aerial user equipment (UE) is described. The method may include receiving, from a base station of a cellular radio access network, a downlink control information message indicating availability of a broadcast message carrying emergency information, receiving the broadcast message, the broadcast message including an indicator identifying that the emergency information is for unmanned aerial vehicles, decoding the emergency information to obtain emergency instructions based on the indicator identifying that the emergency information is for unmanned aerial vehicles, and performing one or more actions for unmanned aerial vehicles based on the emergency instructions.

An apparatus for wireless communication at an aerial UE is described. The apparatus may include a processor, memory coupled with the processor, and instructions stored in the memory. The instructions may be executable by the processor to cause the apparatus to receive, from a base station of a cellular radio access network, a downlink control information message indicating availability of a broadcast message carrying emergency information, receive the broadcast message, the broadcast message including an indicator identifying that the emergency information is for unmanned aerial vehicles, decode the emergency information to obtain emergency instructions based on the indicator identifying that the emergency information is for unmanned aerial vehicles, and perform one or more actions for unmanned aerial vehicles based on the emergency instructions.

Another apparatus for wireless communication at an aerial UE is described. The apparatus may include means for receiving, from a base station of a cellular radio access network, a downlink control information message indicating availability of a broadcast message carrying emergency information, means for receiving the broadcast message, the broadcast message including an indicator identifying that the emergency information is for unmanned aerial vehicles, means for decoding the emergency information to obtain emergency instructions based on the indicator identifying that the emergency information is for unmanned aerial vehicles, and means for performing one or more actions for unmanned aerial vehicles based on the emergency instructions.

A non-transitory computer-readable medium storing code for wireless communication at an aerial UE is described. The code may include instructions executable by a processor to receive, from a base station of a cellular radio access network, a downlink control information message indicating availability of a broadcast message carrying emergency information, receive the broadcast message, the broadcast message including an indicator identifying that the emergency information is for unmanned aerial vehicles, decode the emergency information to obtain emergency instructions based on the indicator identifying that the emergency information is for unmanned aerial vehicles, and perform one or more actions for unmanned aerial vehicles based on the emergency instructions.

In some examples of the method, apparatuses, and non-transitory computer-readable medium described herein, and the method, apparatuses, and non-transitory computer-readable medium may include further operations, features, means, or instructions for determining whether the aerial UE may be inside the geodetic 2D area or the geodetic 3D volume, ignoring the broadcast message when the aerial UE may be determined to be not inside the geodetic 2D area or the geodetic 3D volume, and performing the one or more actions for unmanned aerial vehicles when the aerial UE may be determined to be inside the geodetic 2D area or the geodetic 3D volume.

In some examples of the method, apparatuses, and non-transitory computer-readable medium described herein, the emergency instructions include an identifier of the one or more actions.

In some examples of the method, apparatuses, and non-transitory computer-readable medium described herein, the emergency instructions include an indicator of one or more parameters for the one or more actions to be performed by the aerial UE.

In some examples of the method, apparatuses, and non-transitory computer-readable medium described herein, the indicator of the one or more parameters for the one or more actions to be performed by the aerial UE includes an action string.

Some examples of the method, apparatuses, and non-transitory computer-readable medium described herein may further include operations, features, means, or instructions for transmitting, to the base station, a response message in response to receiving the broadcast message and subsequent to performing the one or more actions, where the received broadcast message includes an indicator that the aerial UE may be to transmit the response message.

In some examples of the method, apparatuses, and non-transitory computer-readable medium described herein, the response message includes a current location of the aerial UE, a confirmation of the performing of the one or more actions, an identification of the aerial UE, or any combination thereof.

In some examples of the method, apparatuses, and non-transitory computer-readable medium described herein, the indicator includes a message identifier of the broadcast message.

In some examples of the method, apparatuses, and non-transitory computer-readable medium described herein, the emergency instructions include safe landing geodetic coordinates, flight path maps for the aerial UE, an altitude value, or any combination thereof, for the one or more actions to be performed by the aerial UE.

In some examples of the method, apparatuses, and non-transitory computer-readable medium described herein, the downlink control information message includes a short message and the broadcast message includes a system information block eight message or a system information block eight message including one or more additional fields associated with unmanned aerial vehicles.

In some examples of the method, apparatuses, and non-transitory computer-readable medium described herein, the one or more actions include an altitude correction, a landing procedure, a warning area exit procedure, a homing procedure, or any combination thereof.

Some examples of the method, apparatuses, and non-transitory computer-readable medium described herein may further include operations, features, means, or instructions for performing the one or more actions further includes updating one or more target operations of the aerial UE based on the emergency instructions.

A method for wireless communication at a base station is described. The method may include receiving, from a network node, emergency instructions for unmanned aerial vehicles, transmitting, to an aerial UE, a downlink control information message indicating availability of a broadcast message carrying emergency information, and transmitting, to one or more aerial UEs, the broadcast message including an indicator identifying that the emergency information is for the unmanned aerial vehicles, the emergency information indicating the emergency instructions.

An apparatus for wireless communication at a base station is described. The apparatus may include a processor, memory coupled with the processor, and instructions stored in the memory. The instructions may be executable by the processor to cause the apparatus to receive, from a network node, emergency instructions for unmanned aerial vehicles, transmit, to an aerial UE, a downlink control information message indicating availability of a broadcast message carrying emergency information, and transmit, to one or more aerial UEs, the broadcast message including an indicator identifying that the emergency information is for the unmanned aerial vehicles, the emergency information indicating the emergency instructions.

Another apparatus for wireless communication at a base station is described. The apparatus may include means for receiving, from a network node, emergency instructions for unmanned aerial vehicles, means for transmitting, to an aerial UE, a downlink control information message indicating availability of a broadcast message carrying emergency information, and means for transmitting, to one or more aerial UEs, the broadcast message including an indicator identifying that the emergency information is for the unmanned aerial vehicles, the emergency information indicating the emergency instructions.

A non-transitory computer-readable medium storing code for wireless communication at a base station is described. The code may include instructions executable by a processor to receive, from a network node, emergency instructions for unmanned aerial vehicles, transmit, to an aerial UE, a downlink control information message indicating availability of a broadcast message carrying emergency information, and transmit, to one or more aerial UEs, the broadcast message including an indicator identifying that the emergency information is for the unmanned aerial vehicles, the emergency information indicating the emergency instructions.

In some examples of the method, apparatuses, and non-transitory computer-readable medium described herein, the broadcast message further includes an indication of a geodetic 2D area or geodetic 3D volume.

In some examples of the method, apparatuses, and non-transitory computer-readable medium described herein, the emergency instructions include an identifier of one or more actions.

In some examples of the method, apparatuses, and non-transitory computer-readable medium described herein, the emergency instructions include an indicator of one or more parameters for one or more actions to be performed by the one or more aerial UEs.

In some examples of the method, apparatuses, and non-transitory computer-readable medium described herein, the indicator of the one or more parameters for the one or more actions to be performed by the aerial UE includes an action string.

Some examples of the method, apparatuses, and non-transitory computer-readable medium described herein may further include operations, features, means, or instructions for receiving, from at least one of the one or more aerial UEs, one or more response messages in response to an indicator that the one or more aerial UEs may be to transmit the one or more response messages, where the transmitted broadcast message includes the indicator that the one or more aerial UEs may be to transmit the one or more response messages.

In some examples of the method, apparatuses, and non-transitory computer-readable medium described herein, the one or more response messages include a current location of the aerial UE, a confirmation of the performing of one or more actions, an identification of the aerial UE, or any combination thereof.

In some examples of the method, apparatuses, and non-transitory computer-readable medium described herein, the indicator includes a message identifier of the broadcast message.

DETAILED DESCRIPTION

Figure 1:
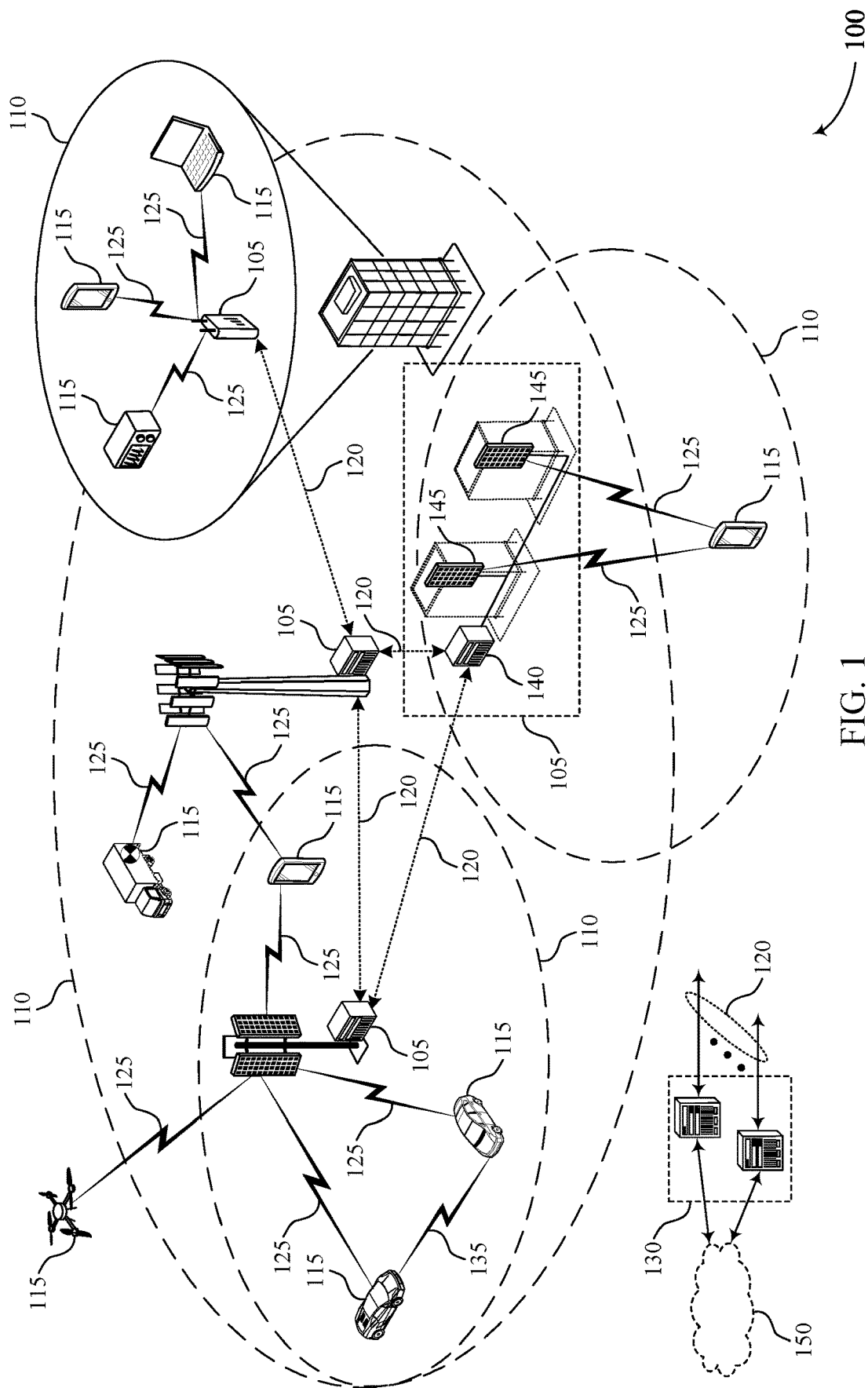
FIG. 1 illustrates an example of a wireless communication system that supports techniques for broadcasting emergency information to unmanned aerial vehicles in accordance with aspects of the present disclosure.

Some wireless communication systems may support aerial user equipments (UEs) which may be devices capable of flying or maneuvering through the air. One example of an aerial UE is an unmanned aerial vehicle (UAV), which may also be referred to as a drone. In some examples, the aerial UEs may communicate with aerial UE controllers, which may be referred to as UAV controllers (UAVCs), that may control the aerial UEs (e.g., using the Internet, Bluetooth, or any form of radio frequency communications). Additionally or alternatively, the aerial UEs may be configured with radio access network (RAN) equipment and may communicate with base stations or other network entities via the RAN (e.g., using 3rd Generation Partnership Project (3GPP) technologies, such as fifth generation (5G) New Radio (NR) networks).

Strictly speaking, an aerial UE would typically comprise at least two separate entities or components. A flight related component may perform some or all of the functions of flying, maneuvering (e.g., to avoid obstacles), navigation, landing, and takeoff and may include a power source (e.g. a battery or hydrogen cell), electric or other types of motors, propellors, sensors and controllers. Another communications related component may perform functions associated with communication with a ground controller and/or with other entities such as a wireless communication system and may employ wireless technologies like fourth generation (4G) Long Term Evolution (LTE) and/or 5G NR. The communications related component may perform functions common to a non-aerial wireless device such as a smartphone, tracking device or Internet of Things (IoT) device and may be referred to a user equipment (UE). The two components may share some resources (e.g. power source, processor and memory) and may coordinate and interact to control a flight path, navigation, and maneuvering of the aerial UE. As discussed herein, an aerial UE can refer to just the communications related component, just the flight related component or to both components. An aerial UE may be an unmanned aerial vehicle and the two terms are used interchangeably herein.

In some emergency scenarios (e.g., earthquakes, tsunamis, or other emergencies in which free air space may be desired), emergency responders such as the police, an air traffic control (ATC), or an unmanned traffic management (UTM), may be unable to efficiently broadcast emergency information directly to multiple aerial UEs in the surrounding area. Accordingly, emergency responders may communicate with the aerial UEs via the RAN. For example, a base station may transmit emergency broadcast messaging (e.g., using system information block eight (SIB8) messages) which conveys emergency information. In some cases, however, the emergency broadcast messaging may not distinguish between aerial UEs and other types of UEs, which may lead to an inefficient use of communication resources (e.g., for non-aerial UEs that decode the emergency broadcast messaging intended for aerial UEs and/or for aerial UEs that decode the emergency broadcast messaging intended for non-aerial UEs). It may be beneficial to implement a method whereby a base station may indicate emergency information intended for aerial UEs (e.g., UAVs) in a way which does not disrupt other types of UEs.

As described herein, a base station may receive emergency instructions from an authorized third party (e.g., an emergency responder, a law enforcement agency, an ATC, etc.) that the base station is to broadcast to aerial UEs in a wireless communications system. In response to receiving the emergency instructions, the base station may generate a broadcast message (e.g., in a System Information Block (SIB) 8 (SIB8)) including the emergency instructions. For example, the base station may generate the broadcast message which indicates aerial operations (e.g., using a UAV action parameter having seven bits indicating the aerial operations and one bit indicating a feedback configuration for responding to the broadcast message) for aerial UEs to perform. In some implementations, the broadcast message may include additional parameters for the aerial operations (e.g., as a UAV action string parameter). For example, the base station may indicate altitude correction values, coordinates, etc., for the aerial operations. To distinguish between aerial UEs and other types of UEs, the base station may include, in the broadcast message, an indication (e.g., a field such as a messageIdentifier field) that the emergency information is for aerial UEs. Accordingly, non-aerial UEs may ignore the broadcast message, but aerial UEs may receive and decode the broadcast message to obtain the emergency instructions (e.g., the aerial operations and associated parameters). The aerial UEs may perform the indicated aerial operations according to the received broadcast message. In some implementations, the aerial UEs may transmit feedback to the base station in response to the broadcast message. Implementing aspects of the present disclosure may allow for emergency communication with aerial UEs and aerial operations for aerial UEs based on broadcast signaling, without disrupting other types of UEs (e.g., ground UEs, or other non-aerial UEs), which may lead to an increased efficiency of communications resource use, among other benefits.

Aspects of the disclosure are initially described in the context of wireless communications systems. Aspects of the disclosure are further described in the context of a broadcast message, a messaging scheme, and a process flow. Aspects of the disclosure are further illustrated by and described with reference to apparatus diagrams, system diagrams, and flowcharts that relate to techniques for broadcasting emergency information to unmanned aerial vehicles in a wireless communication system.

FIG. 1 illustrates an example of a wireless communications system 100 that supports techniques for broadcasting emergency information to unmanned aerial vehicles in a wireless communication system in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some examples of the wireless communications system 100 may support aerial UEs 115 which may be devices capable of flying or maneuvering through the air. For example, the wireless communications system 100 may support UAVs (e.g., drones) which may communicate with other devices of the wireless communications system 100 such as base stations 105. In some emergency scenarios, third party systems such as emergency responders (e.g., a law enforcement agency, an ATC, or an UTM) may communicate emergency information to the aerial UEs 115 via a base station 105.

For example, a base station 105 may receive emergency instructions for aerial UEs 115 (e.g., identifying a set of actions to perform) from a third party. The base station 105 may generate a broadcast message (e.g., a SIB8) including emergency information such as the emergency instructions, associated parameters, and an indication that the emergency information is for the aerial UEs 115. The base station 105 may transmit a short message indicating the aerial UEs 115 to monitor for the broadcast message and may transmit the broadcast message accordingly. An aerial UE 115 may receive the short message and the broadcast message and decode the broadcast message to obtain the emergency instructions. The aerial UE 115 may perform actions according to the emergency instructions. Implementing aspects of the present disclosure may enable communicating emergency information to aerial UEs 115 without disrupting other types of UEs 115 (e.g., ground UEs 115).

Figure 2:
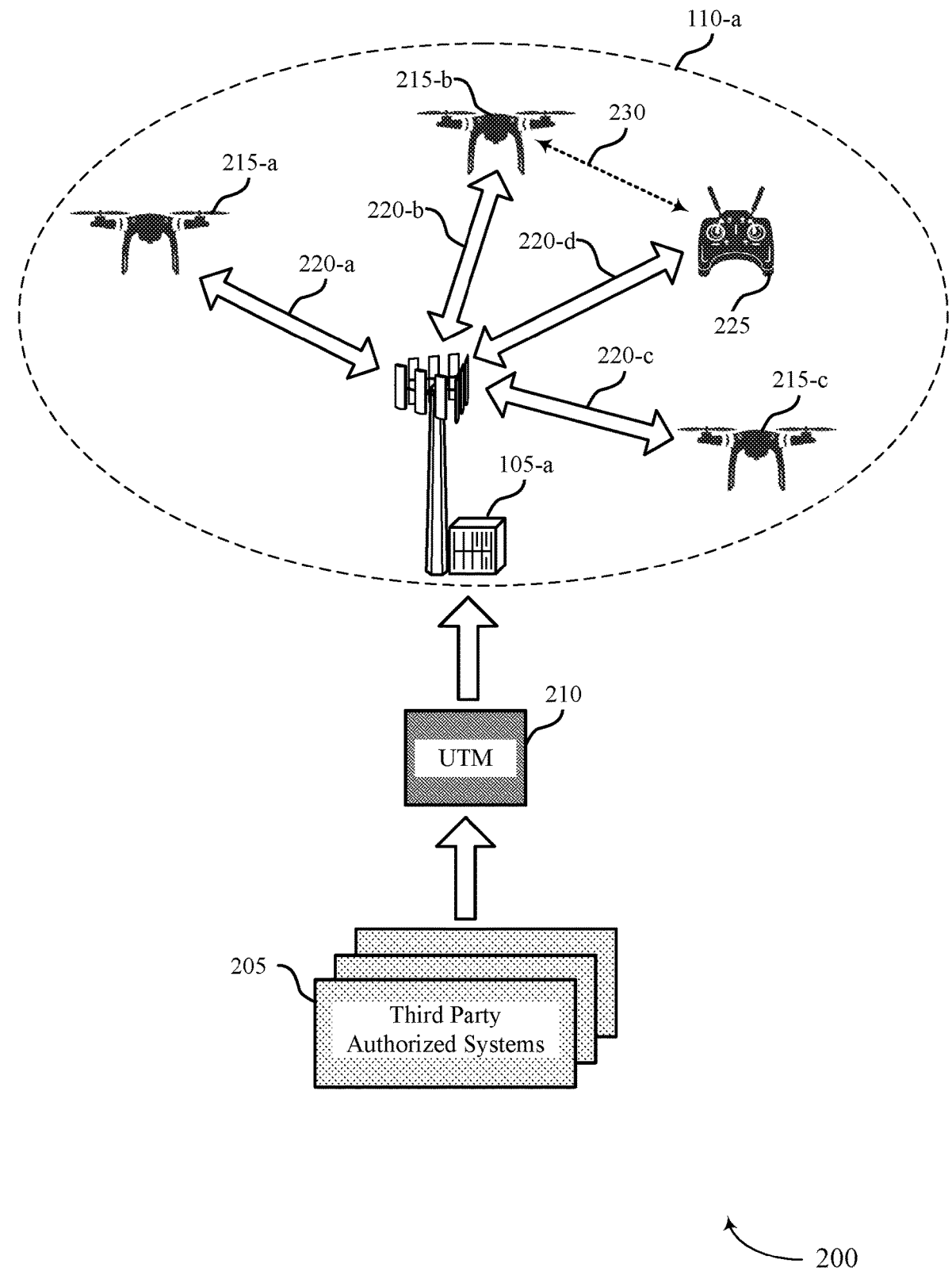
FIG. 2 illustrates an example of a wireless communication system that supports techniques for broadcasting emergency information to unmanned aerial vehicles in accordance with aspects of the present disclosure.

FIG. 2 illustrates an example of a wireless communications system 200 that supports techniques for broadcasting UAV emergency information in wireless communications systems, in accordance with various aspects of the present disclosure. In some examples, the wireless communications system 200 may implement aspects of a wireless communications system 100, as described with reference to FIG. 1. The wireless communications system 200 may include an aerial UE 215-*a*, an aerial UE 215-*b*, and an aerial UE 215-*c* which may be examples of an aerial UE 115, as described with reference to FIG. 1. The wireless communications system 200 may also include a base station 105-*a* which may be an example of a base station 105, as described with reference to FIG. 1. The base station 105 may be associated with a cell providing wireless communications services within a geographic coverage area 110-*a*. During an emergency scenario, the base station 105-*a* may broadcast emergency messaging to the one or more of the aerial UE 215-*a*, the aerial UE 215-*b*, or the aerial UE 215-*c*.

An aerial UE 215 may establish a communication link 220 (e.g., an access link, such as a Uu interface) with the base station 105-*a* and may communicate with the base station 105-*a* to support different application (e.g., video, remote command and control (C2), etc.). For example, the aerial UE 215-*a*, the aerial UE 215-*b*, and the aerial UE 215-*c* may establish a communication link 220-*a*, a communication link 220-*b*, and a communication link 220-*c*, respectively, with the base station 105-*a*. In some examples, an aerial UE 215 may establish a connection 230 (e.g., using Wi-Fi, Bluetooth, or any form of radio frequency communication) with an aerial UE controller 225 (e.g., a remote control). In some cases, the connection 230 may be within a visual line of sight or beyond a visual link of sight (e.g., up to 10 km or beyond). The connection 230 may be referred to as a unmanned aerial vehicle-to-everything (U2X) command and control (U2X-C2) connection and may be, for example, a PC5, bidirectional connection. For example, the aerial UE 215-*b* may establish the connection 230 with the aerial UE controller 225. An aerial UE 215 may receive flight instructions from the base station 105. For example, an third-party authorized system 205 may convey flight or emergency instruction to a UTM 210. The UTM 210 may convey the instructions to the base station 105-*a* for transmitting via the RAN. Accordingly, the base station 105-*a* may broadcast the instructions to the aerial UEs 215 or the aerial UE controller 225.

In emergency scenarios, the base station 105-*a* may receive emergency instructions for the aerial UEs 215 from the third-party authorized system 205 (e.g., via the UTM 210). The base station 105-*a* may generate a broadcast message (e.g., a SIBS) indicating emergency information, including the emergency instructions, and an indicator (e.g., by or in a message identifier field) that emergency information of the broadcast message is for aerial UEs 215 (e.g., UAVs). In some examples, the base station 105-*a* may indicate the emergency instruction using a UAV action field (e.g., UAVAction) which includes seven bits indicating aerial operations for the aerial UEs 215 to perform and one bit indicating a feedback configuration for responding to the broadcast message (e.g., indicating whether the aerial UEs 215 are to transmit feedback messages in response to the broadcast message). In some implementations, the base station 105-*a* may also indicate parameters for the aerial operations using a UAV action string field (e.g., UAVActionString). For example, the base station 105-*a* may indicate flight path parameters (e.g., flight path maps), geographic coordinates (e.g., three-dimensional coordinates indicating a latitude, a longitude, and an altitude), altitude correctional values, etc., for the aerial operations.

The base station 105-*a* may transmit a short message in downlink control information (DCI) to the aerial UEs 215 indicating (e.g., using a etwsAndCmasIndication field) the aerial UEs 215 to monitor for emergency information of a subsequent broadcast message. Accordingly, the base station 105-*a* may transmit, and the aerial UEs 215 may receive, the broadcast message indicating the emergency instructions. In response to receiving the broadcast message, the aerial UEs 215 may decode the emergency information to obtain the emergency instructions (e.g., the actions or aerial operations and associated parameters) and may perform the aerial operations accordingly. In some examples, the broadcast message may include a two-dimensional (2D) geodetic area or a three-dimensional (3D) geodetic volume such that, if an aerial UE 215 (e.g., the aerial UE 215-*b*, the aerial UE 215-*c*, or the aerial UE 215-*c*) receives the broadcast message, the aerial UE 215 may determine whether the aerial UE 215 is operating within the geodetic area or the geodetic volume. Accordingly, the aerial UE 215 may ignore the broadcast message if the aerial UE 215 is not within the geodetic area or the geodetic volume and may perform the aerial operations if the aerial UE 215 is within the geodetic area or the geodetic volume.

In some examples, if indicated by the base station 105-*a* to report feedback, the aerial UEs 215 may transmit feedback messages (e.g., acknowledgement (ACK)/negative acknowledgement (NACK) messages) to the base station 105-*a*. In some implementations, the aerial UEs 215 may use the feedback message to indicate completion of the aerial operations. In some examples, the aerial UEs 215 may indicate a UAV identifier, a current altitude, a current location, or any combination thereof using the feedback message. The base station 105-*a* may indicate the feedback received from the aerial UEs 215 to the aerial UE controller 225, the UTM 210, the third-party authorized system 205, or any combination thereof. Implementing aspects of the wireless communications system 200 may enable emergency communication with aerial UEs 215 without disrupting other types of UEs (e.g., ground UEs, or otherwise non-aerial UEs), which may lead to an efficient resource utilization, among other benefits.

Figure 3:
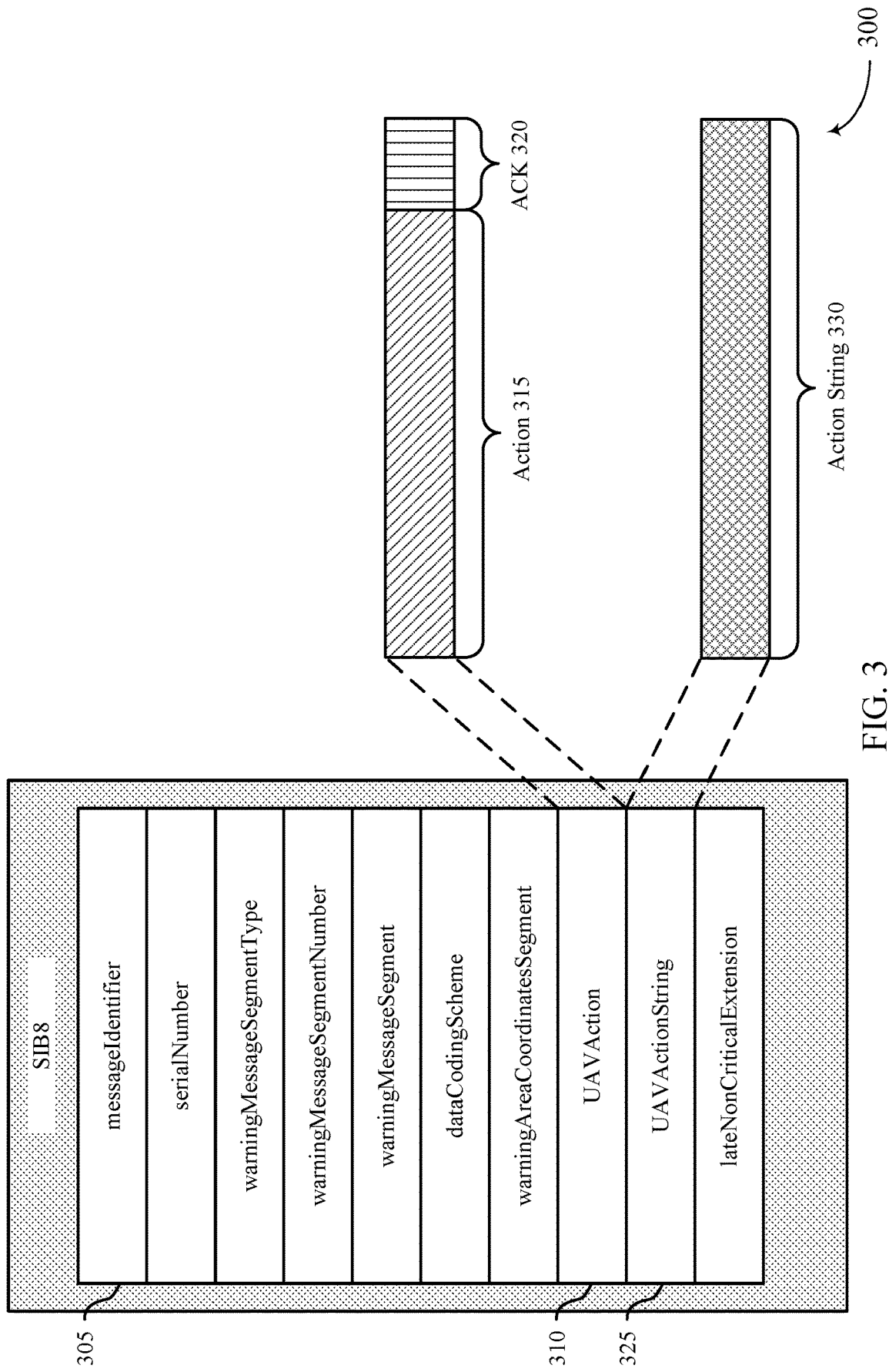
FIG. 3 illustrates an example of a broadcast message that supports techniques for broadcasting emergency information to unmanned aerial vehicles in a wireless communication system in accordance with aspects of the present disclosure.

FIG. 3 illustrates an example of a broadcast message 300 in a system that supports techniques for broadcasting UAV emergency information in wireless communications systems, in accordance with various aspects of the present disclosure. In some examples, the broadcast message 300 may be implemented in aspects of the wireless communications system 100 or the wireless communications system 200, as described with reference to FIGS. 1 and 2. For example, a base station 105 may transmit the broadcast message 300 to aerial UEs 215 to indicate information to the aerial UEs 215 in emergency scenarios.

The broadcast message 300 may include a message identifier 305 (e.g., a messageIdentifier field) indicating that emergency information of the broadcast message 300 is for UAVs. For example, a base station 105 may determine a value of the message identifier 305 which enables or indicates UAVs to decode the broadcast message 300 while other types of UEs (i.e. UEs that are not aerial UEs) may ignore or disregard the broadcast message 300. In some examples, the broadcast message 300 may also include a UAV action field 310 (e.g., UAVAction) which indicates aerial operations for UAVs to perform. In some implementations, the UAV action field 310 may include a set of seven bits 315 which indicates the aerial operations and a feedback bit 320 which indicates a feedback configuration for responding to (e.g., acknowledging) the broadcast message 300 (e.g., indicates whether the UAVs are to report feedback). In such examples, the broadcast message 300 may also include a UAV action string field 325 (e.g., UAVActionString) which indicates parameters for the aerial operations using a set of eight bits 330. In accordance with Table 1, the UAV action field 310 and the UAV action string field 325 may indicate aerial operations such as, for example, an altitude correction and an associated altitude value, a landing procedure at provided coordinates, an exit procedure, or a home landing procedure. It is noted that the aerial operations illustrated in Table 1 are representative of potential aerial operations but do not enumerate all aerial operations the base station 105 may indicate. Additional examples of emergency instructions (e.g., for aerial operations) may include instructions to follow an emergency path schedule, update a feedback message with a UAV identity, update or indicate a UAV location prior to or subsequent to performing the aerial operations.

coordinates (e.g. a definition of a warning area such as one or more coordinates and other parameters defining an area as a circle, ellipse or polygon), or any combination thereof which UAVs may use to determine operations to perform in emergency scenarios. Implementing aspects of the broadcast message 300 may enable emergency communications with UAVs without disrupting other types of UEs, which may lead to an efficient use of communication resource utilization.

Figure 4:
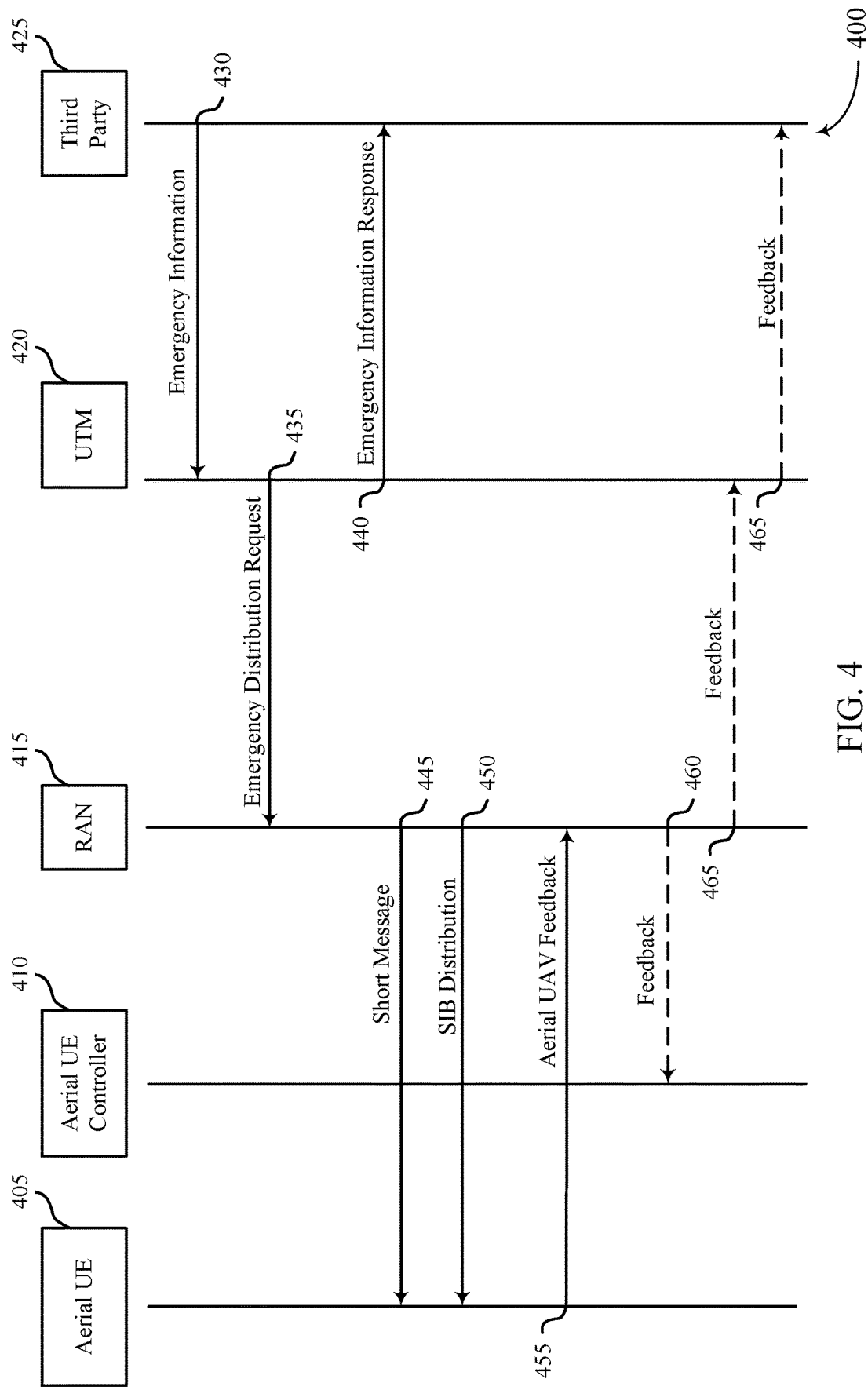
FIG. 4 illustrates an example of a messaging scheme in a system that supports techniques for broadcasting emergency information to unmanned aerial vehicles in a wireless communication system in accordance with aspects of the present disclosure.

FIG. 4 illustrates an example of a messaging scheme 400 in a system that supports techniques for broadcasting UAV emergency information in wireless communication systems, in accordance with various aspects of the present disclosure. In some examples, the messaging scheme 400 may be implemented in the wireless communications system 100 or

TABLE 1

| UAVAction (Bits 1-7) | UAVAction (Bit 8) | UAVActionString | Description |
|---|---|---|---|
| Altitude Correction | 1 | Altitude Value | UAV to adjust altitude (e.g. fly below or above a defined altitude value) |
| Land UAV at Coordinates | 1 | Landing Coordinates | UAV to land at defined landing coordinates |
| Exit Warning Area | 1 | N/A | UAV to exit a warning area (e.g. an area in which the warning message is being broadcast) |
| Follow Home Landing Position | 1 | N/A | UAV to land at a configured home position |
| Hover | 1 | N/A | UAV to hover at current position |
| Flash lights/ sound audio alarm/transmit RF signal | 1 | N/A | UAV to flash lights and/or sound an audio alarm and/or transmit a pre-configured RF signal (e.g. to enable the UAV to be more easily heard, seen or identified and located by a wireless receiver) |
| Reduce speed | 1 | Maximum speed | UAV to reduce speed to below a defined maximum speed |

In some implementations, the broadcast message 300 may indicate more than one action. For example, the broadcast message 300 may indicate both an "Exit Warning Area" action and a "Flash lights/sound audio alarm/transmit RF signal" action as described in Table 1. An indication of two or more actions may be useful in some instances, e.g. when a number of aerial UEs are flying within the airspace of an airport and need to perform multiple actions to exit the airspace in a safe manner. An indication of multiple actions may be supported by including an indication of multiple actions in the UAV action field 310 and including indications of the individual actions (e.g. "Exit Warning Area" and "Flash lights/sound audio alarm/transmit RF signal" in the previous example) as part of the UAV action string field 325 or in some other field of the SIB8. Alternatively, an indication of one of the multiple actions may be included in the UAV action field 310 (e.g. "Exit Warning Area" in the previous example) with indications of the other actions (e.g. "Flash lights/sound audio alarm/transmit RF signal" in the previous example) included as part of the UAV action string field 325 or in some other field of the SIB8.

The broadcast message 300 may include additional parameters such as, for example, a serial number, a warning message segment type, a warning message segment number, a warning message, a data coding scheme, warning area the wireless communications system 200, as described with reference to FIGS. 1 and 2. Similarly, the messaging scheme 400 may implement aspects of the broadcast message 300, as described with reference to FIG. 3. The messaging scheme 400 may be implemented (e.g., in emergency scenarios) by an aerial UE 405, an aerial UE controller 410, a RAN 415, a UTM 420, and a third party 425 which may be examples of the corresponding devices and systems described herein.

At 430, the third party 425 may convey emergency information (e.g., using an emergency information distribution request) to the UTM 420. For example, the third party 425 may send, to the UTM 420, emergency instruction or aerial operations that the aerial UE 405 is to perform.

At 435, the UTM 420 may forward the emergency information to the RAN 415. At 440, the UTM 420 may transmit a response (e.g., an emergency information distribution response) to the third party 425.

At 445, the RAN 415 may transmit a short message (e.g., a DCI message) to the aerial UE 405 indicating that emergency information will be transmitted in a subsequent broadcast message (e.g., SIB8). At 450, the RAN 415 may transmit the broadcast message to the aerial UE 405. In some examples, the broadcast message may include an indication (e.g., as a message identifier) that emergency information of the broadcast message is for UAVs (e.g. and is not intended for non-aerial UEs). In some implementations, the broadcast message may include a UAV action field indicating an action (e.g., based on the emergency instructions) for the aerial UE 405. For example, the UAV action field may identify aerial operations for the aerial UE 405 to perform. In some examples, the broadcast message may also include a UAV action string field providing parameters (e.g., coordinates, altitude values, etc.) for the aerial operations. In some implementations, the broadcast message may include a request for an acknowledgment. In some examples, more than one action may be indicated in the UAV action field, the UAV action string field and/or in another field of the broadcast message as described previously for FIG. 3. In some implementations, the request for the acknowledgment and/or the action or actions may be conveyed as part of the emergency information at 430 and 435.

At 455, the aerial UE 405 may transmit a feedback message (e.g., a UAV ACK message) to the RAN 415, e.g., if a request for an acknowledgment was received at 450. The RAN 415 may, at 460, forward the feedback message to the aerial UE controller 410. Similarly, at 465, the RAN 415 may forward the feedback message to the UTM 420 and the UTM 420 may transmit the feedback message to the third party 425.

Implementing aspects of the messaging scheme 400 may enable broadcasting emergency communications to UAVs without disrupting other types of UEs which may lead to an increased efficiency of communications.

Figure 5:
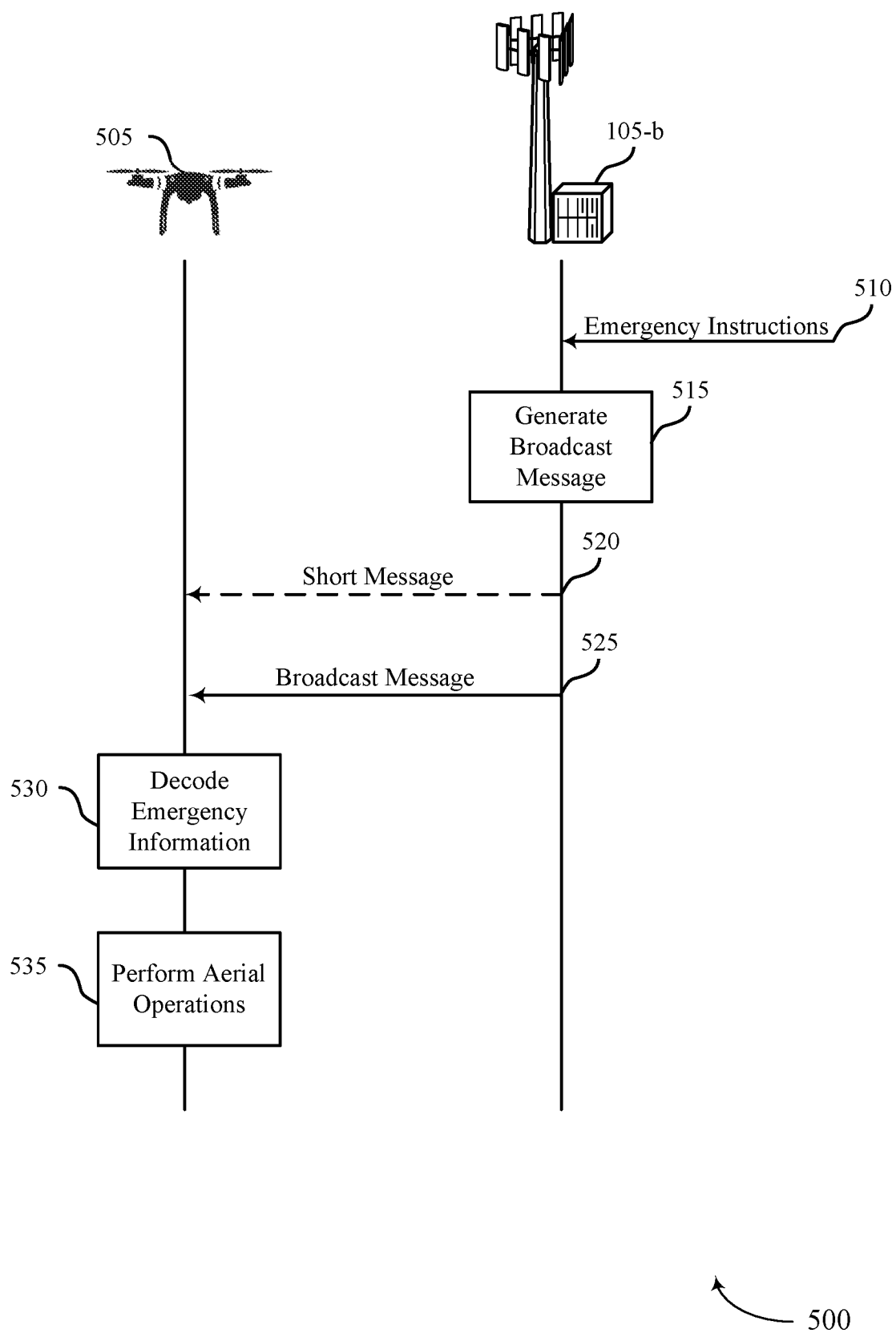
FIG. 5 illustrates an example of a process flow in a system that supports techniques for broadcasting emergency information to unmanned aerial vehicles in a wireless communications system in accordance with aspects of the present disclosure.

FIG. 5 illustrates an example of a process flow 500 in a system that supports techniques for broadcasting UAV emergency information in wireless communications systems, in accordance with various aspects of the present disclosure. In some examples, the messaging scheme 400 may be implemented in the wireless communications system 100 or the wireless communications system 200, as described with reference to FIGS. 1 and 2. Similarly, the messaging scheme 400 may implement aspects of the broadcast message 300 or the messaging scheme 400, as described with reference to FIGS. 3 and 4. The process flow 500 may include an aerial UE 505 and a base station 155-*b* which may be examples of the corresponding devices described herein. Alternative examples of the following may be implemented in which some processes are performed in a different order than described or are not performed at all. In some examples, the processes may include additional features not mentioned below, or further processes may be added.

At 510, the base station 105-*b* may receive emergency instructions from a third-party (e.g., a law enforcement agency, emergency responders, a UTM, an ATC, etc.).

At 515, based on the emergency instructions, the base station 105-*b* may generate a broadcast message (e.g., a SIB8). For example, the base station 105-*b* may generate a broadcast message which includes emergency information including the emergency instructions. The broadcast message may include an indication (e.g., as a message identifier field) that the broadcast message is for UAVs. The broadcast message may also identify the emergency instructions (e.g., using a UAV action field), including aerial operations the aerial UE 505 is to perform. In some examples, the broadcast message may also include an indication of parameters for the aerial operations.

In some examples, at 520, the base station 105-*b* may transmit a short message in DCI indicating the aerial UE 505 to monitor for emergency information in a subsequent broadcast message. At 525, the base station 105-*b* may transmit the broadcast message to the aerial UE 505.

At 530, the aerial UE 505 may decode the broadcast message to obtain the emergency instructions and associated parameters. Accordingly, at 535, the aerial UE 505 may perform the aerial operations indicated in the broadcast message. Implementing aspects of the process flow 500 may enable broadcasting emergency communications to UAVs without disrupting other types of UEs which may lead to an increased efficiency of communications.

Figure 6:
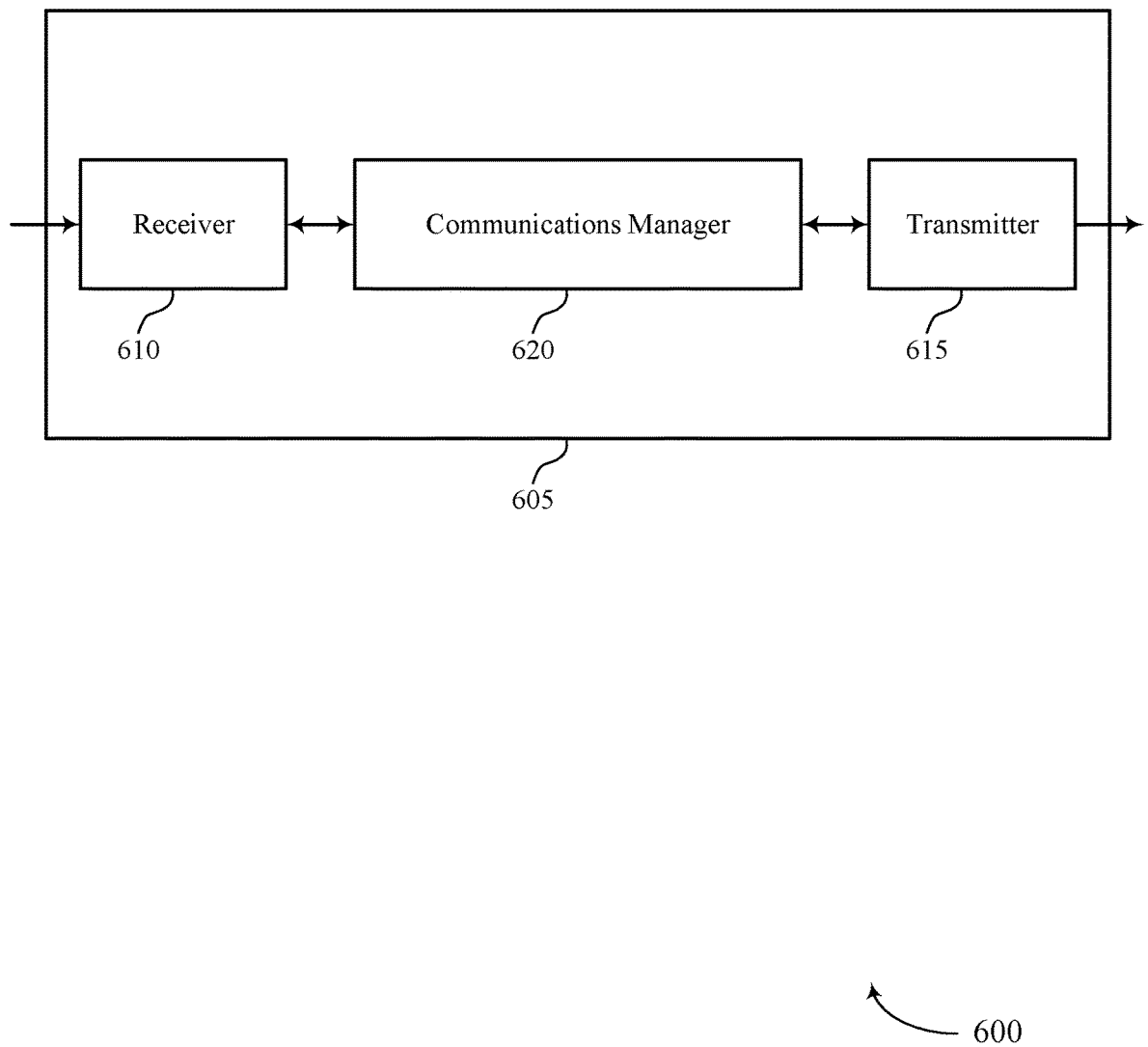
FIGS. 6 and 7 show block diagrams of devices that support techniques for broadcasting emergency information to unmanned aerial vehicles in a wireless communications system in accordance with aspects of the present disclosure.

FIG. 6 shows a block diagram 600 of a device 605 that supports techniques for broadcasting emergency information to unmanned aerial vehicles in a wireless communication system in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for broadcasting emergency information to unmanned aerial vehicles in a wireless communication system). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for broadcasting emergency information to unmanned aerial vehicles in a wireless communication system). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for broadcasting emergency information to unmanned aerial vehicles in a wireless communication system as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at an aerial UE in accordance with examples as disclosed herein. For example, the communications manager 620 may be configured as or otherwise support a means for receiving, from a base station of a cellular radio access network, a downlink control information message indicating availability of a broadcast message carrying emergency information. The communications manager 620 may be configured as or otherwise support a means for receiving the broadcast message, the broadcast message including an indicator identifying that the emergency information is for unmanned aerial vehicles. The communications manager 620 may be configured as or otherwise support a means for decoding the emergency information to obtain emergency instructions based on the indicator identifying that the emergency information is for unmanned aerial vehicles. The communications manager 620 may be configured as or otherwise support a means for performing one or more actions for unmanned aerial vehicles based on the emergency instructions.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for communicating emergency instructions such that the device 605 may exhibit a reduced power consumption, a reduced processing, or a more efficient resource utilization.

Figure 7:
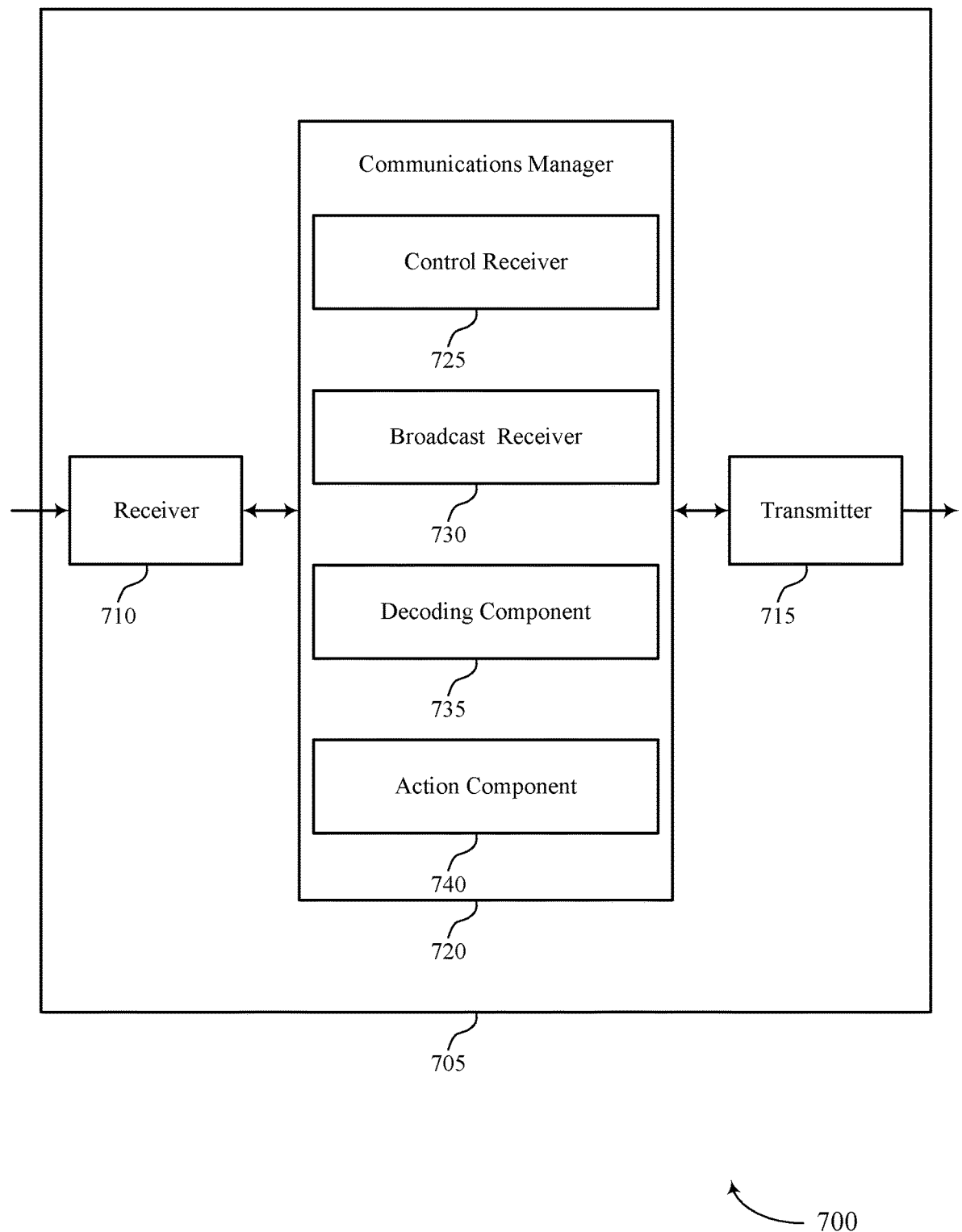

FIG. 7 shows a block diagram 700 of a device 705 that supports techniques for broadcasting emergency information to unmanned aerial vehicles in a wireless communication system in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for broadcasting emergency information to unmanned aerial vehicles in a wireless communication system). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for broadcasting emergency information to unmanned aerial vehicles in a wireless communication system). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for broadcasting emergency information to unmanned aerial vehicles in a wireless communication system as described herein. For example, the communications manager 720 may include a control receiver 725, a broadcast receiver 730, a decoding component 735, an action component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at an aerial UE in accordance with examples as disclosed herein. The control receiver 725 may be configured as or otherwise support a means for receiving, from a base station of a cellular radio access network, a downlink control information message indicating availability of a broadcast message carrying emergency information. The broadcast receiver 730 may be configured as or otherwise support a means for receiving the broadcast message, the broadcast message including an indicator identifying that the emergency information is for unmanned aerial vehicles. The decoding component 735 may be configured as or otherwise support a means for decoding the emergency information to obtain emergency instructions based on the indicator identifying that the emergency information is for unmanned aerial vehicles. The action component 740 may be configured as or otherwise support a means for performing one or more actions for unmanned aerial vehicles based on the emergency instructions.

Figure 8:
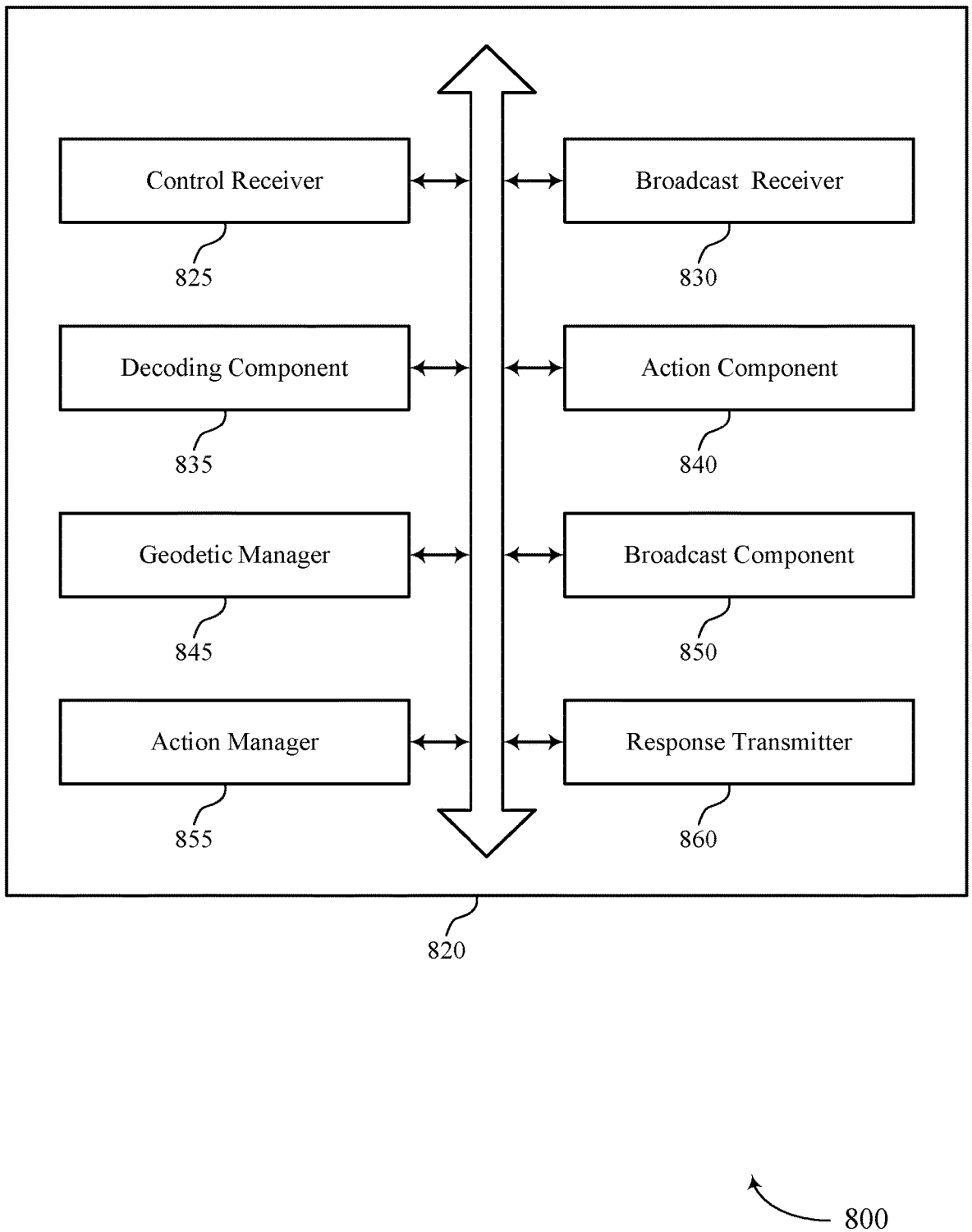
FIG. 8 shows a block diagram of a communications manager that supports techniques for broadcasting emergency information to unmanned aerial vehicles in a wireless communications system in accordance with aspects of the present disclosure.

FIG. 8 shows a block diagram 800 of a communications manager 820 that supports techniques for broadcasting emergency information to unmanned aerial vehicles in a wireless communication system in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for broadcasting emergency information to unmanned aerial vehicles in a wireless communication system as described herein. For example, the communications manager 820 may include a control receiver 825, a broadcast receiver 830, a decoding component 835, an action component 840, a geodetic manager 845, a broadcast component 850, an action manager 855, a response transmitter 860, or any combination thereof. Each of these components may communicate, directly or indirectly, with one another (e.g., via one or more buses).

The communications manager 820 may support wireless communication at an aerial UE in accordance with examples as disclosed herein. The control receiver 825 may be configured as or otherwise support a means for receiving, from a base station of a cellular radio access network, a downlink control information message indicating availability of a broadcast message carrying emergency information. The broadcast receiver 830 may be configured as or otherwise support a means for receiving the broadcast message, the broadcast message including an indicator identifying that the emergency information is for unmanned aerial vehicles. The decoding component 835 may be configured as or otherwise support a means for decoding the emergency information to obtain emergency instructions based on the indicator identifying that the emergency information is for unmanned aerial vehicles. The action component 840 may be configured as or otherwise support a means for performing one or more actions for unmanned aerial vehicles based on the emergency instructions.

In some examples, in which the broadcast message includes geodetic 2D area or a geodetic 3D volume and to support wireless communication at an aerial UE, the geodetic manager 845 may be configured as or otherwise support a means for determining whether the aerial vehicle is inside the geodetic 2D area or geodetic 3D volume. In some examples, in which the broadcast message includes geodetic 2D area or a geodetic 3D volume and to support wireless communication at an aerial UE, the broadcast component 850 may be configured as or otherwise support a means for ignoring the broadcast message when the aerial UE is determined to be not inside the geodetic 2D area or geodetic 3D volume; and. In some examples, in which the broadcast message includes geodetic 2D area or a geodetic 3D volume and to support wireless communication at an aerial UE, the action manager 855 may be configured as or otherwise support a means for performing the one or more actions for unmanned aerial vehicles when the aerial UE is determined to be inside the geodetic 2D area or geodetic 3D volume.

In some examples, the emergency instructions include an identifier of the one or more actions. In some examples, the emergency instructions include an indicator of one or more parameters for the one or more actions to be performed by the aerial UE. In some examples, the indicator of the one or more parameters for the one or more actions to be performed by the aerial UE includes an action string.

In some examples, the response transmitter 860 may be configured as or otherwise support a means for transmitting, to the base station, a response message in response to receiving the broadcast message, where the received broadcast message includes an indicator that the aerial UE is to transmit the response message.

In some examples, the response message includes a current location of the aerial UE, a confirmation of the performing of the one or more actions, an identification of the aerial UE, or any combination thereof. In some examples, the indicator includes a message identifier of the broadcast message. In some examples, the emergency instructions include safe landing geodetic coordinates, flight path maps for the aerial UE, an altitude value, or any combination thereof, for the one or more actions to be performed by the aerial UE.

In some examples, the downlink control information message includes a short message. In some examples, the broadcast message includes a system information block eight message. In some examples, the one or more actions include an altitude correction, a landing procedure, a warning area exit procedure, a homing procedure, or any combination thereof. In some examples, performing the one or more actions further includes updating one or more target operations of the aerial UE based on the emergency instructions.

Figure 9:
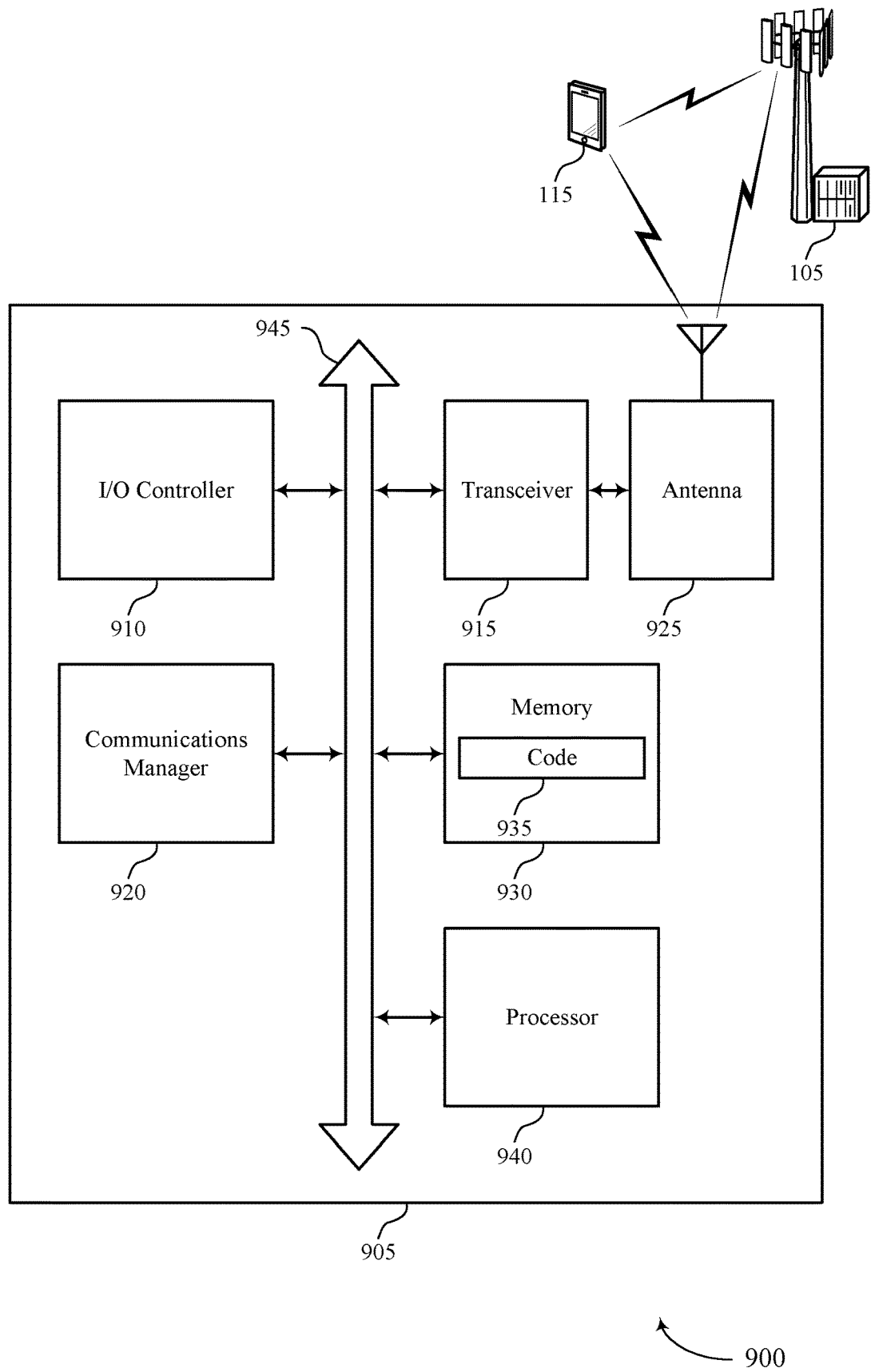
FIG. 9 shows a diagram of a system including a device that supports techniques for broadcasting emergency information to unmanned aerial vehicles in a wireless communication system in accordance with aspects of the present disclosure.

FIG. 9 shows a diagram of a system 900 including a device 905 that supports techniques for broadcasting emergency information to unmanned aerial vehicles in a wireless communication system in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for broadcasting emergency information to unmanned aerial vehicles in a wireless communication system). For example, the device 905 or a component of the device 905 may include a processor 940 and memory 930 coupled to the processor 940, the processor 940 and memory 930 configured to perform various functions described herein.

The communications manager 920 may support wireless communication at an aerial UE in accordance with examples as disclosed herein. For example, the communications manager 920 may be configured as or otherwise support a means for receiving, from a base station of a cellular radio access network, a downlink control information message indicating availability of a broadcast message carrying emergency information. The communications manager 920 may be configured as or otherwise support a means for receiving the broadcast message, the broadcast message including an indicator identifying that the emergency information is for unmanned aerial vehicles. The communications manager 920 may be configured as or otherwise support a means for decoding the emergency information to obtain emergency instructions based on the indicator identifying that the emergency information is for unmanned aerial vehicles. The communications manager 920 may be configured as or otherwise support a means for performing one or more actions for unmanned aerial vehicles based on the emergency instructions.

By including or configuring the communications manager 920 in accordance with examples as described herein, the device 905 may support techniques for communicating emergency instructions such that the device 905 may exhibit a reduced power consumption, a reduced processing, an improved coordination between devices, or a more efficient resource utilization, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for broadcasting emergency information to unmanned aerial vehicles in a wireless communication system as described herein, or the processor 940 and the memory 930 may be otherwise configured to perform or support such operations.

Figure 10:
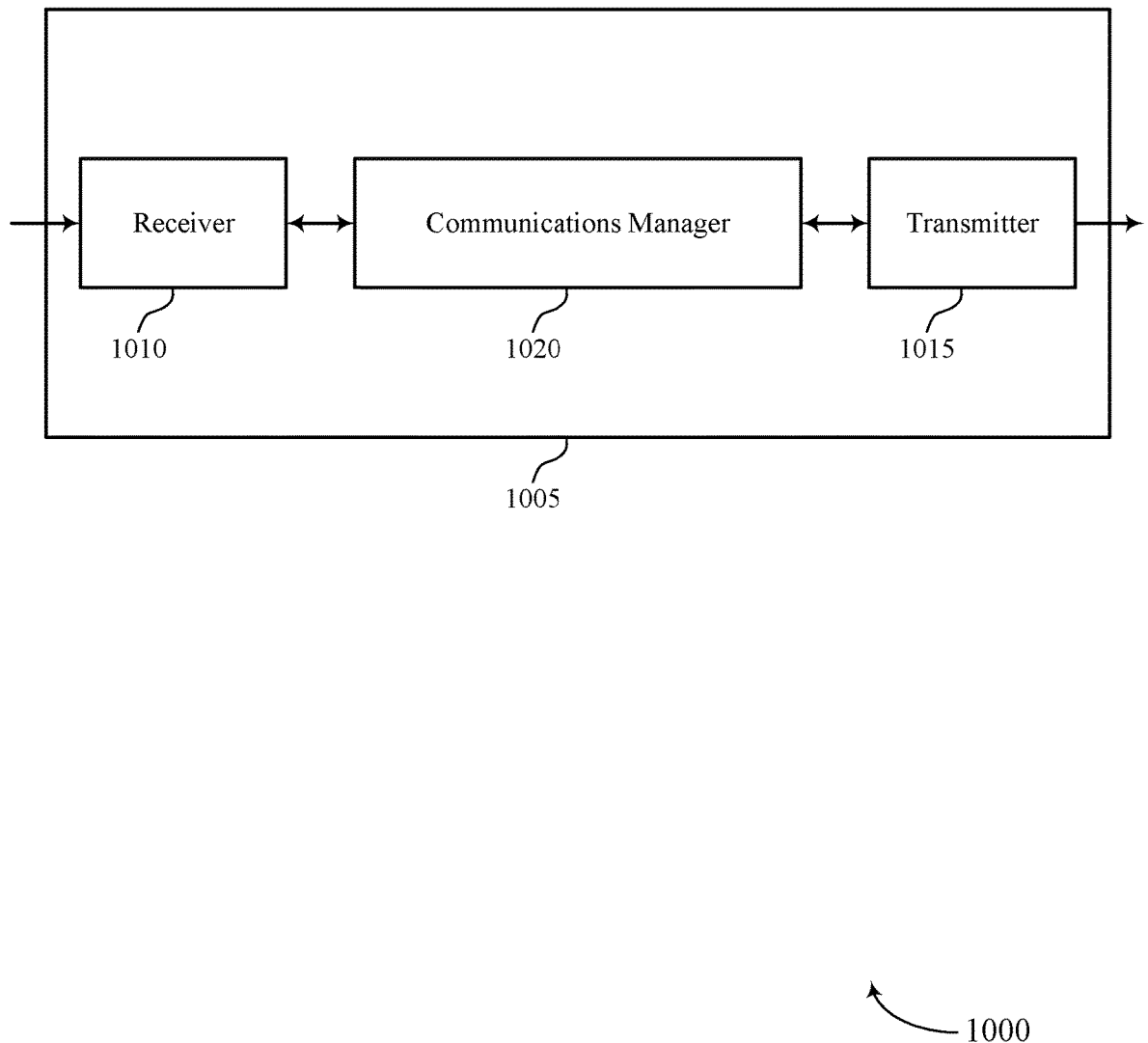
FIGS. 10 and 11 show block diagrams of devices that support techniques for broadcasting emergency information to unmanned aerial vehicles in a wireless communication system in accordance with aspects of the present disclosure.

FIG. 10 shows a block diagram 1000 of a device 1005 that supports techniques for broadcasting emergency information to unmanned aerial vehicles in a wireless communication system in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for broadcasting emergency information to unmanned aerial vehicles in a wireless communication system). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for broadcasting emergency information to unmanned aerial vehicles in a wireless communication system). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for broadcasting emergency information to unmanned aerial vehicles in a wireless communication system as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for receiving, from a network node, emergency instructions for unmanned aerial vehicles. The communications manager 1020 may be configured as or otherwise support a means for transmitting, to an aerial UE, a downlink control information message indicating availability of a broadcast message carrying emergency information. The communications manager 1020 may be configured as or otherwise support a means for transmitting, to one or more aerial UEs, the broadcast message including an indicator identifying that the emergency information is for the unmanned aerial vehicles, the emergency information indicating the emergency instructions.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for communicating emergency instructions such that the device 1005 may exhibit a reduced power consumption, a reduced processing, an improved coordination between devices, or a more efficient resource utilization, among other benefits.

Figure 11:
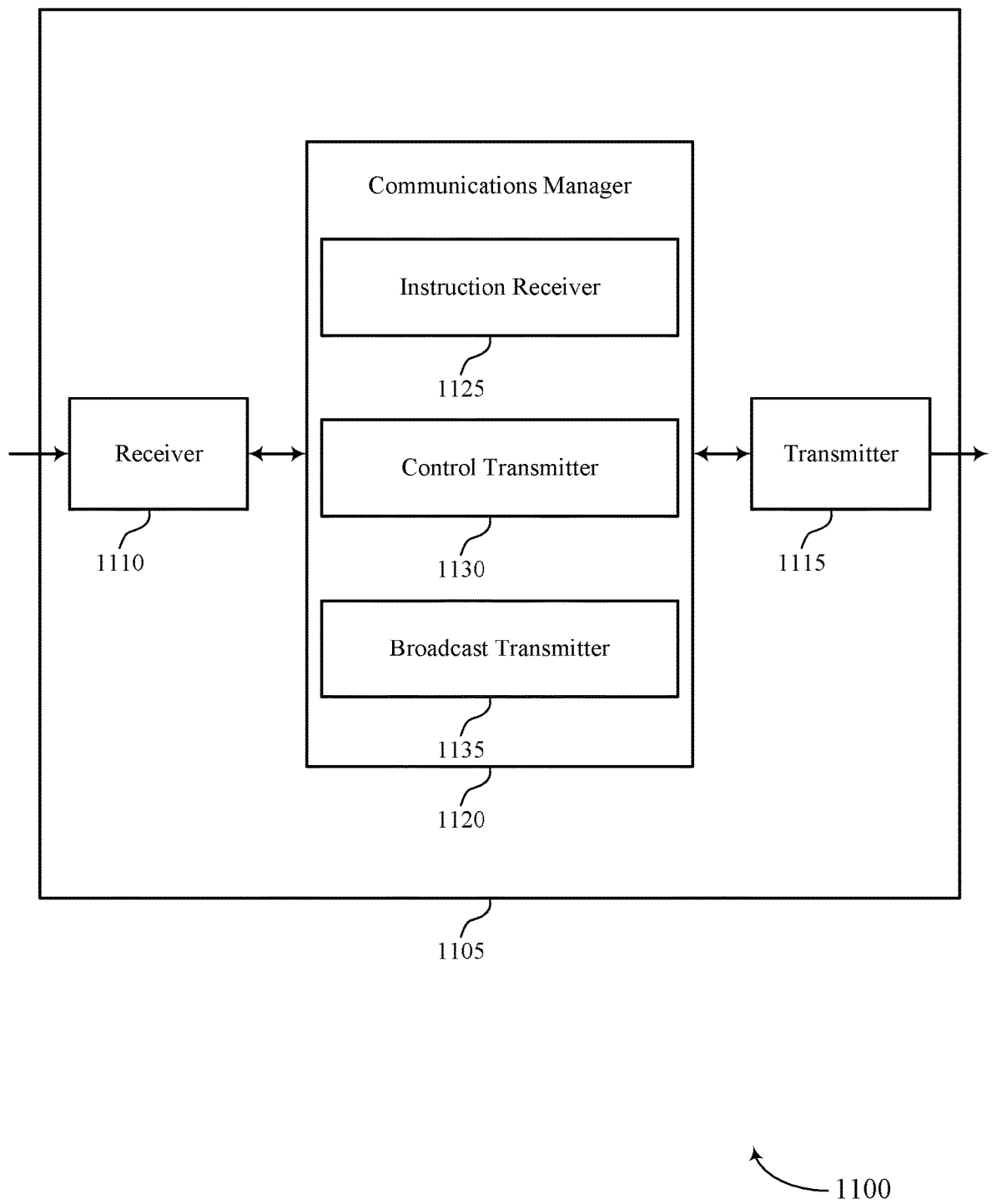

FIG. 11 shows a block diagram 1100 of a device 1105 that supports techniques for broadcasting emergency information to unmanned aerial vehicles in a wireless communication system in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for broadcasting emergency information to unmanned aerial vehicles in a wireless communication system). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for broadcasting emergency information to unmanned aerial vehicles in a wireless communication system). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for broadcasting emergency information to unmanned aerial vehicles in a wireless communication system as described herein. For example, the communications manager 1120 may include an instruction receiver 1125, a control transmitter 1130, a broadcast transmitter 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The instruction receiver 1125 may be configured as or otherwise support a means for receiving, from a network node, emergency instructions for unmanned aerial vehicles. The control transmitter 1130 may be configured as or otherwise support a means for transmitting, to an aerial UE, a downlink control information message indicating availability of a broadcast message carrying emergency information. The broadcast transmitter 1135 may be configured as or otherwise support a means for transmitting, to one or more aerial UEs, the broadcast message including an indicator identifying that the emergency information is for the unmanned aerial vehicles, the emergency information indicating the emergency instructions.

Figure 12:
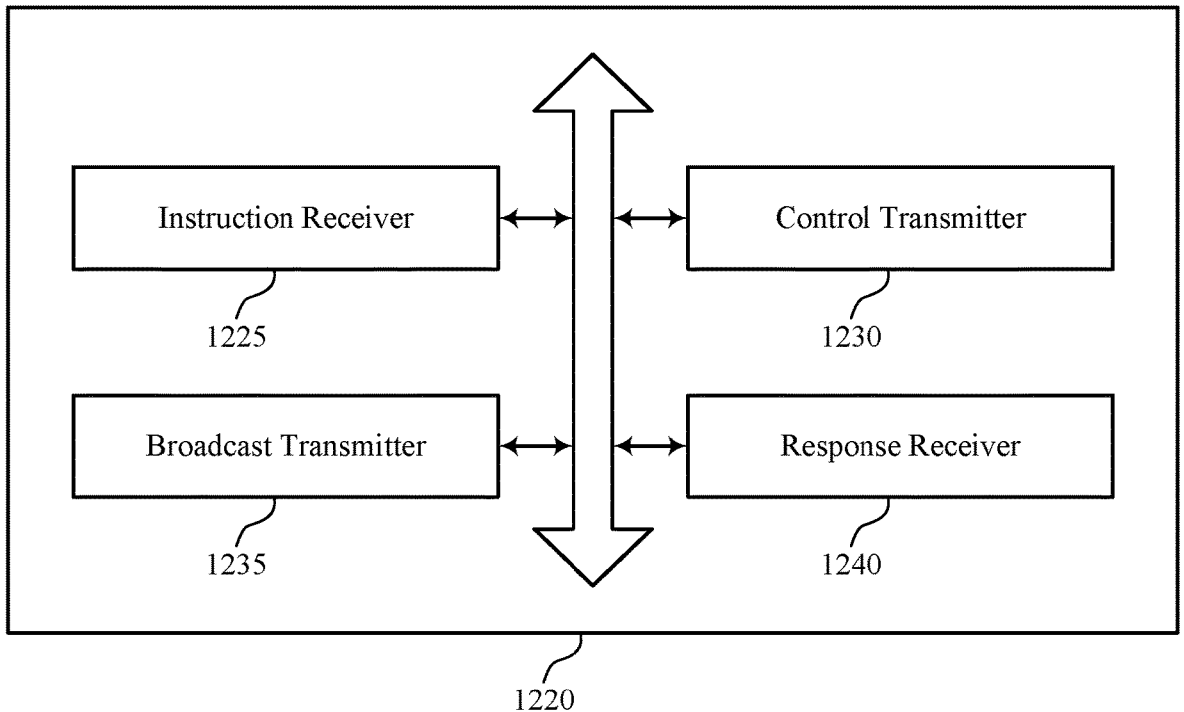
FIG. 12 shows a block diagram of a communications manager that supports techniques for broadcasting emergency information to unmanned aerial vehicles in a wireless communication system in accordance with aspects of the present disclosure.

FIG. 12 shows a block diagram 1200 of a communications manager 1220 that supports techniques for broadcasting emergency information to unmanned aerial vehicles in a wireless communication system in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for broadcasting emergency information to unmanned aerial vehicles in a wireless communication system as described herein. For example, the communications manager 1220 may include an instruction receiver 1225, a control transmitter 1230, a broadcast transmitter 1235, a response receiver 1240, or any combination thereof. Each of these components may communicate, directly or indirectly, with one another (e.g., via one or more buses).

The communications manager 1220 may support wireless communication at a base station in accordance with examples as disclosed herein. The instruction receiver 1225 may be configured as or otherwise support a means for receiving, from a network node, emergency instructions for unmanned aerial vehicles. The control transmitter 1230 may be configured as or otherwise support a means for transmitting, to an aerial UE, a downlink control information message indicating availability of a broadcast message carrying emergency information. The broadcast transmitter 1235 may be configured as or otherwise support a means for transmitting, to one or more aerial UEs, the broadcast message including an indicator identifying that the emergency information is for the unmanned aerial vehicles, the emergency information indicating the emergency instructions.

In some examples, the broadcast message further includes a geodetic 2D area or geodetic 3D volume. In some examples, the emergency instructions include an identifier of the one or more actions. In some examples, the emergency instructions include an indicator of one or more parameters for one or more actions to be performed by the one or more aerial UEs. In some examples, the indicator of the one or more parameters for the one or more actions to be performed by the aerial UE includes an action string.

In some examples, the response receiver 1240 may be configured as or otherwise support a means for receiving, from at least one of the one or more aerial UEs, one or more response messages in response to transmitting the broadcast message, where the transmitted broadcast message includes an indicator that the one or more aerial UEs are to transmit the response message. In some examples, the indicator includes a message identifier of the broadcast message.

In some examples, the response message includes a current location of the aerial UE, a confirmation of the performing of the one or more actions, an identification of the aerial UE, or any combination thereof.

Figure 13:
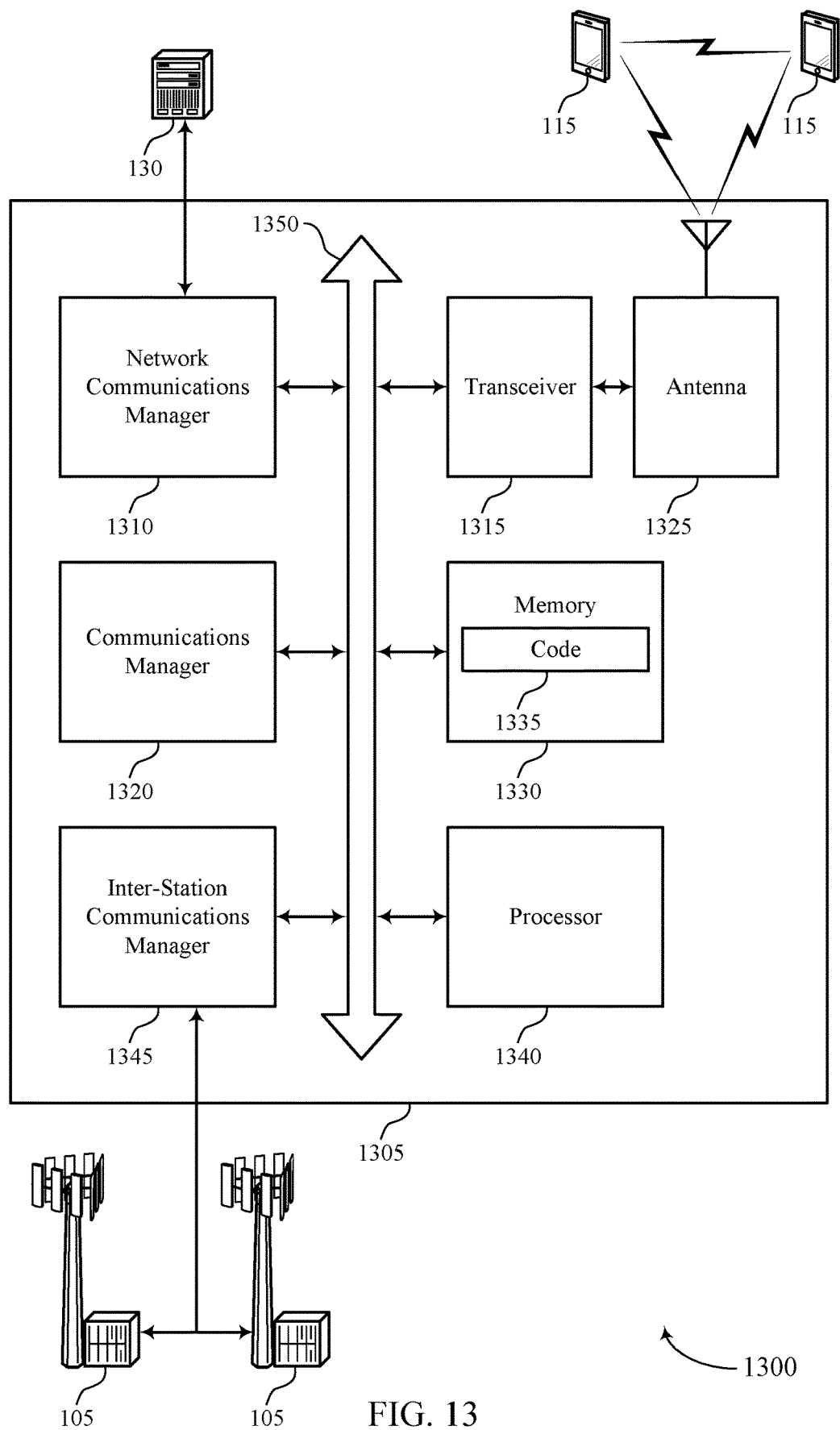
FIG. 13 shows a diagram of a system including a device that supports techniques for broadcasting emergency information to unmanned aerial vehicles in a wireless communication system in accordance with aspects of the present disclosure.

FIG. 13 shows a diagram of a system 1300 including a device 1305 that supports techniques for broadcasting emergency information to unmanned aerial vehicles in a wireless communication system in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for broadcasting emergency information to unmanned aerial vehicles in a wireless communication system). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for receiving, from a network node, emergency instructions for unmanned aerial vehicles. The communications manager 1320 may be configured as or otherwise support a means for transmitting, to an aerial UE, a downlink control information message indicating availability of a broadcast message carrying emergency information. The communications manager 1320 may be configured as or otherwise support a means for transmitting, to one or more aerial UEs, the broadcast message including an indicator identifying that the emergency information is for the unmanned aerial vehicles, the emergency information indicating the emergency instructions.

By including or configuring the communications manager 1320 in accordance with examples as described herein, the device 1305 may support techniques for communicating emergency instructions such that the device 1305 may exhibit a reduced power consumption, a reduced processing, an improved coordination between devices, or a more efficient resource utilization, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for broadcasting emergency information to unmanned aerial vehicles in a wireless communication system as described herein, or the processor 1340 and the memory 1330 may be otherwise configured to perform or support such operations.

Figure 14:
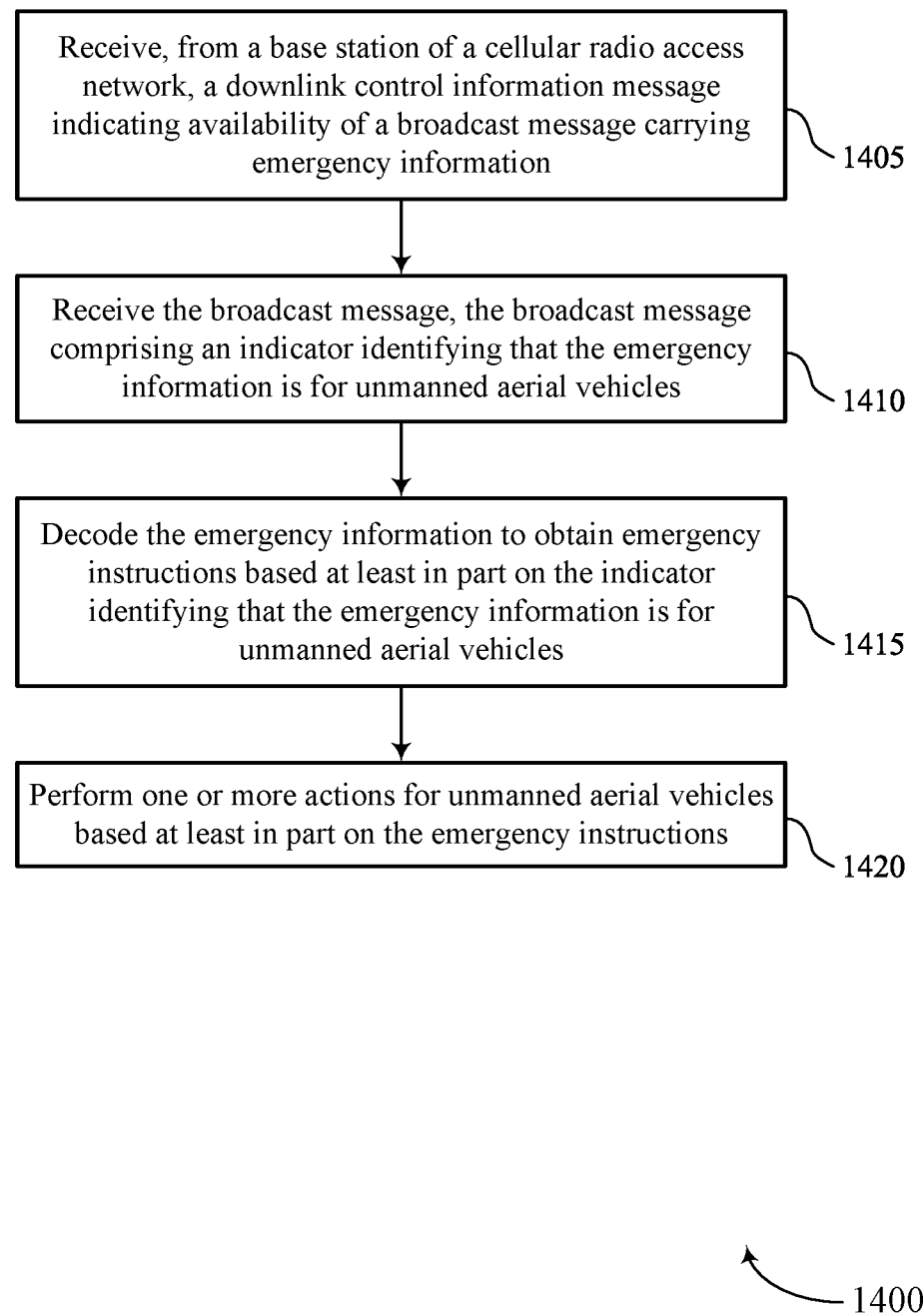
FIGS. 14 through 18 show flowcharts illustrating methods that support techniques for broadcasting emergency information to unmanned aerial vehicles in a wireless communication system in accordance with aspects of the present disclosure.

FIG. 14 shows a flowchart illustrating a method 1400 that supports techniques for broadcasting emergency information to unmanned aerial vehicles in a wireless communication system in accordance with aspects of the present disclosure. The operations of the method 1400 may be implemented by an aerial UE or its components as described herein. For example, the operations of the method 1400 may be performed by a UE 115, an aerial UE 215, 405, 505 or a device 605 or 705 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station of a cellular radio access network, a downlink control information message indicating availability of a broadcast message carrying emergency information. The operations of 1405 may be performed in accordance with examples as disclosed herein. In some examples, aspects of the operations of 1405 may be performed by a control receiver 825 as described with reference to FIG. 8.

At 1410, the method may include receiving the broadcast message, the broadcast message including an indicator identifying that the emergency information is for unmanned aerial vehicles. The operations of 1410 may be performed in accordance with examples as disclosed herein. In some examples, aspects of the operations of 1410 may be performed by a broadcast receiver 830 as described with reference to FIG. 8.

At 1415, the method may include decoding the emergency information to obtain emergency instructions based on the indicator identifying that the emergency information is for unmanned aerial vehicles. The operations of 1415 may be performed in accordance with examples as disclosed herein. In some examples, aspects of the operations of 1415 may be performed by a decoding component 835 as described with reference to FIG. 8.

At 1420, the method may include performing one or more actions for unmanned aerial vehicles based on the emergency instructions. The operations of 1420 may be performed in accordance with examples as disclosed herein. In some examples, aspects of the operations of 1420 may be performed by an action component 840 as described with reference to FIG. 8.

Figure 15:
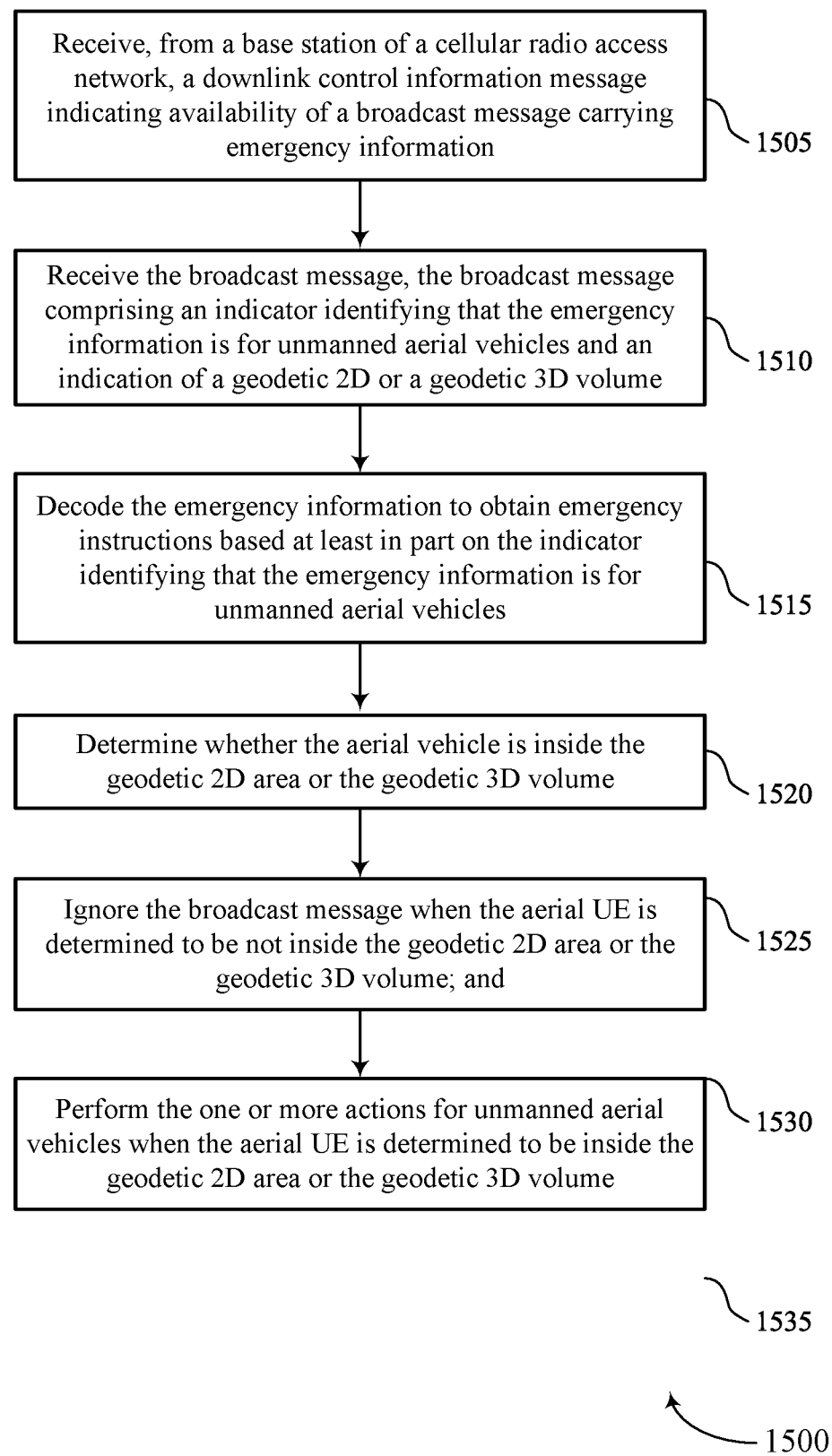

FIG. 15 shows a flowchart illustrating a method 1500 that supports techniques for broadcasting emergency information to unmanned aerial vehicles in a wireless communication system in accordance with aspects of the present disclosure. The operations of the method 1500 may be implemented by a UE or its components as described herein. For example, the operations of the method 1500 may be performed by a UE 115, an aerial UE 215, 405, 505 or a device 605 or 705 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station of a cellular radio access network, a downlink control information message indicating availability of a broadcast message carrying emergency information. The operations of 1505 may be performed in accordance with examples as disclosed herein. In some examples, aspects of the operations of 1505 may be performed by a control receiver 825 as described with reference to FIG. 8.

At 1510, the method may include receiving the broadcast message, the broadcast message including an indicator identifying that the emergency information is for unmanned aerial vehicles, an indication of a geodetic 2D area or a geodetic 3D volume, and an indication of one or more actions for unmanned aerial vehicles. The operations of 1510 may be performed in accordance with examples as disclosed herein. In some examples, aspects of the operations of 1510 may be performed by a broadcast receiver 830 as described with reference to FIG. 8.

At 1515, the method may include decoding the emergency information to obtain emergency instructions based on the indicator identifying that the emergency information is for unmanned aerial vehicles. The operations of 1515 may be performed in accordance with examples as disclosed herein. In some examples, aspects of the operations of 1515 may be performed by a decoding component 835 as described with reference to FIG. 8.

At 1520, the method may include determining whether the aerial vehicle is inside the geodetic 2D area or the geodetic 3D volume. For example, the UE may determine a location for the UE (e.g. using GPS, another Global Navigation Satellite System such as Galileo, Glonass or Beidou and/or using inertial sensors and/or a barometric sensor) and determine whether the determined location is inside the geodetic 2D area or the geodetic 3D volume. The operations of 1520 may be performed in accordance with examples as disclosed herein. In some examples, aspects of the operations of 1520 may be performed by a geodetic manager 845 as described with reference to FIG. 8.

At 1525, the method may include ignoring the broadcast message when the aerial UE is determined to be not inside the geodetic 2D area or the geodetic 3D volume; and. The operations of 1525 may be performed in accordance with examples as disclosed herein. In some examples, aspects of the operations of 1525 may be performed by a broadcast component 850 as described with reference to FIG. 8.

At 1530, the method may include performing the one or more actions for unmanned aerial vehicles when the aerial UE is determined to be inside the geodetic 2D area or the geodetic 3D volume. For example, the one or more actions for unmanned aerial vehicles may include one or more of: an adjustment to altitude (e.g. to fly below or above a defined altitude value); landing at defined landing coordinates; exiting a warning area (e.g. an area in which the broadcast message is being broadcast); landing at a configured home position; hovering at a current position; flashing lights and/or sounding an audio alarm and/or transmitting a pre-configured RF signal (e.g. to enable the UAV to be more easily heard, seen or identified and located by a wireless receiver); or reducing speed to below a defined maximum speed. The operations of 1530 may be performed in accordance with examples as disclosed herein. In some examples, aspects of the operations of 1530 may be performed by an action manager 855 as described with reference to FIG. 8.

Figure 16:
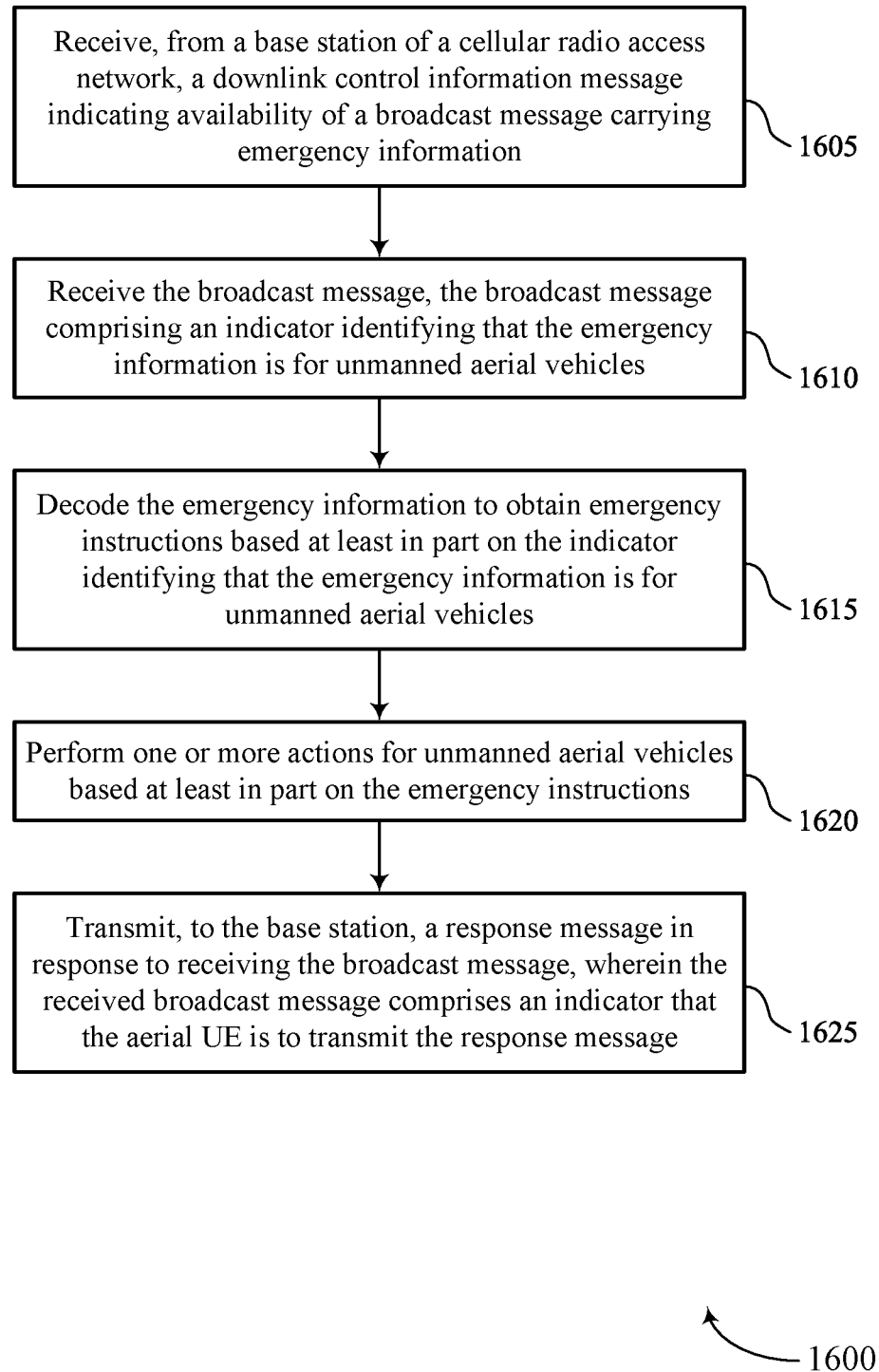

FIG. 16 shows a flowchart illustrating a method 1600 that supports techniques for broadcasting emergency information to unmanned aerial vehicles in a wireless communication system in accordance with aspects of the present disclosure. The operations of the method 1600 may be implemented by a UE or its components as described herein. For example, the operations of the method 1600 may be performed by a UE 115, an aerial UE 215, 405, 505 or a device 605 or 705 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station of a cellular radio access network, a downlink control information message indicating availability of a broadcast message carrying emergency information. The operations of 1605 may be performed in accordance with examples as disclosed herein. In some examples, aspects of the operations of 1605 may be performed by a control receiver 825 as described with reference to FIG. 8.

At 1610, the method may include receiving the broadcast message, the broadcast message including an indicator identifying that the emergency information is for unmanned aerial vehicles. The operations of 1610 may be performed in accordance with examples as disclosed herein. In some examples, aspects of the operations of 1610 may be performed by a broadcast receiver 830 as described with reference to FIG. 8.

At 1615, the method may include decoding the emergency information to obtain emergency instructions based on the indicator identifying that the emergency information is for unmanned aerial vehicles. The operations of 1615 may be performed in accordance with examples as disclosed herein. In some examples, aspects of the operations of 1615 may be performed by a decoding component 835 as described with reference to FIG. 8.

At 1620, the method may include performing one or more actions for unmanned aerial vehicles based on the emergency instructions. The operations of 1620 may be performed in accordance with examples as disclosed herein. In some examples, aspects of the operations of 1620 may be performed by an action component 840 as described with reference to FIG. 8.

At 1625, the method may include transmitting, to the base station, a response message in response to receiving the broadcast message, where the received broadcast message includes an indicator that the aerial UE is to transmit the response message. The operations of 1625 may be performed in accordance with examples as disclosed herein. In some examples, aspects of the operations of 1625 may be performed by a response transmitter 860 as described with reference to FIG. 8.

Figure 17:
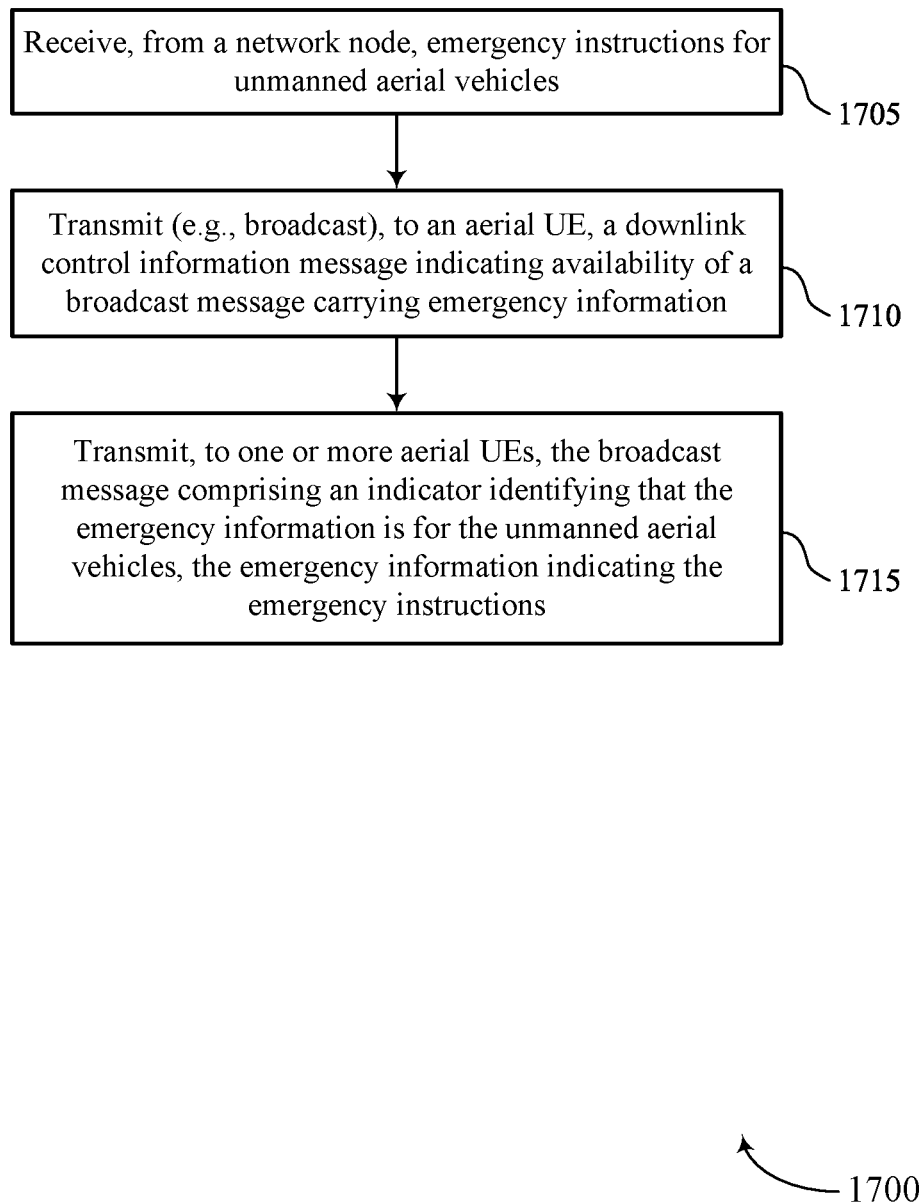

FIG. 17 shows a flowchart illustrating a method 1700 that supports techniques for broadcasting emergency information to unmanned aerial vehicles in a wireless communication system in accordance with aspects of the present disclosure. The operations of the method 1700 may be implemented by a base station or its components as described herein. For example, the operations of the method 1700 may be performed by a base station 105 (e.g. a gNB or eNB) as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a network node, emergency instructions for unmanned aerial vehicles. The operations of 1705 may be performed in accordance with examples as disclosed herein. In some examples, aspects of the operations of 1705 may be performed by an instruction receiver 1225 as described with reference to FIG. 12.

At 1710, the method may include transmitting (e.g. broadcasting), to one or more aerial UEs, a downlink control information message indicating availability of a broadcast message carrying emergency information. The operations of 1710 may be performed in accordance with examples as disclosed herein. In some examples, aspects of the operations of 1710 may be performed by a control transmitter 1230 as described with reference to FIG. 12.

At 1715, the method may include transmitting (e.g. broadcasting), to one or more aerial UEs, the broadcast message including an indicator identifying that the emergency information is for unmanned aerial vehicles, the emergency information indicating the emergency instructions. The operations of 1715 may be performed in accordance with examples as disclosed herein. In some examples, aspects of the operations of 1715 may be performed by a broadcast transmitter 1235 as described with reference to FIG. 12.

Figure 18:
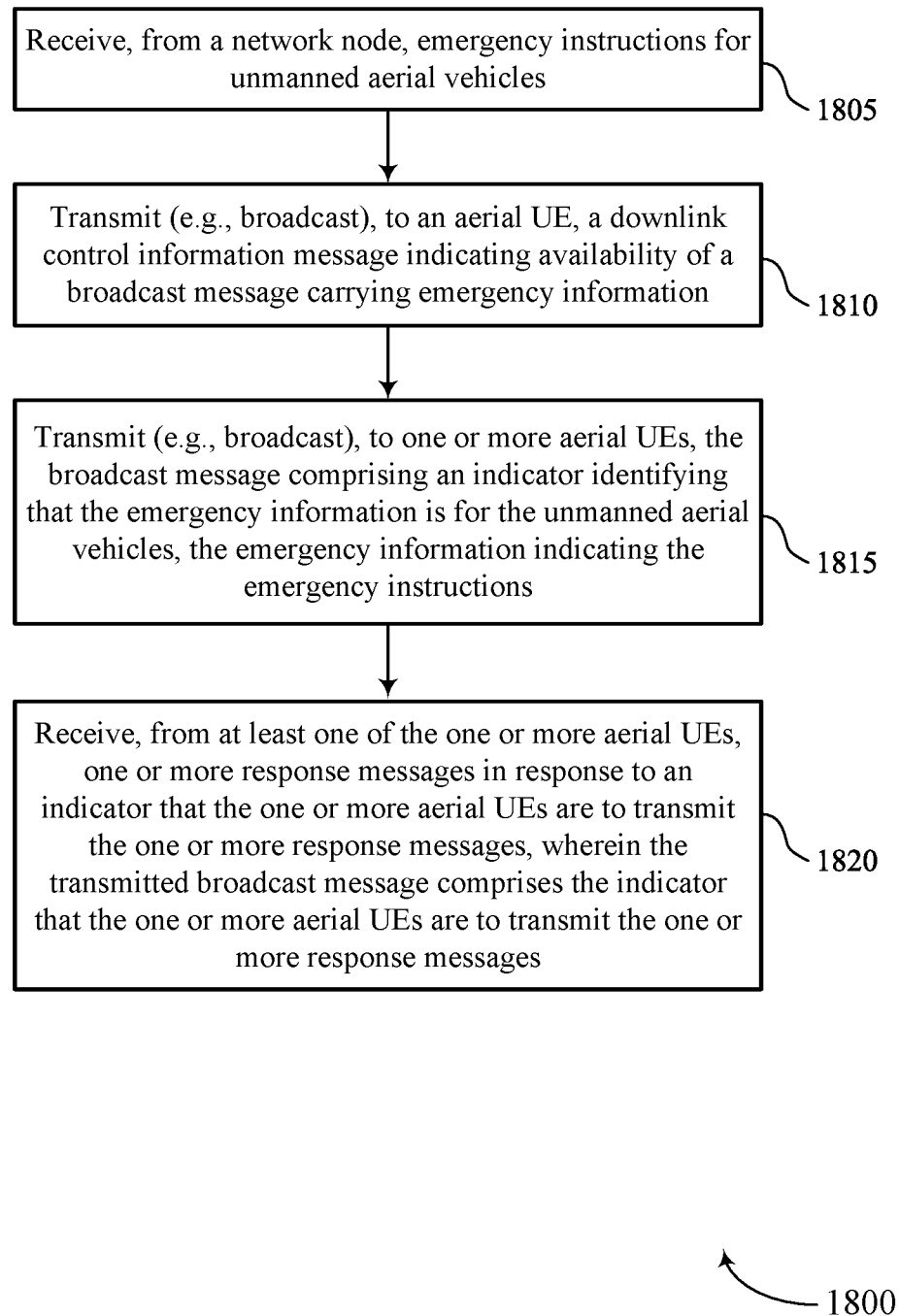

FIG. 18 shows a flowchart illustrating a method 1800 that supports techniques for broadcasting emergency information to unmanned aerial vehicles in a wireless communication system in accordance with aspects of the present disclosure. The operations of the method 1800 may be implemented by a base station or its components (e.g. a gNB or eNB) as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include receiving, from a network node, emergency instructions for unmanned aerial vehicles. The operations of 1805 may be performed in accordance with examples as disclosed herein. In some examples, aspects of the operations of 1805 may be performed by an instruction receiver 1225 as described with reference to FIG. 12.

At 1810, the method may include transmitting (e.g. broadcasting), to one or more aerial UEs, a downlink control information message indicating availability of a broadcast message carrying emergency information. The operations of 1810 may be performed in accordance with examples as disclosed herein. In some examples, aspects of the operations of 1810 may be performed by a control transmitter 1230 as described with reference to FIG. 12.

At 1815, the method may include transmitting (e.g. broadcasting), to one or more aerial UEs, where the broadcast message includes: an indicator identifying that the emergency information is for unmanned aerial vehicles; and an indicator indicating that the one or more aerial UEs are to transmit one or more response messages, and where the emergency information indicates the emergency instructions. The operations of 1815 may be performed in accordance with examples as disclosed herein. In some examples, aspects of the operations of 1815 may be performed by a broadcast transmitter 1235 as described with reference to FIG. 12.

At 1820, the method may include receiving, from at least one of the one or more aerial UEs, one or more response messages in response to the indicator that the one or more aerial UEs are to transmit the one or more response messages. The operations of 1820 may be performed in accordance with examples as disclosed herein. In some examples, aspects of the operations of 1820 may be performed by a response receiver 1240 as described with reference to FIG. 12.

The following provides an overview of aspects of the present disclosure:

Aspect 1: A method for wireless communication at an aerial UE, comprising: receiving, from a base station of a cellular radio access network, a downlink control information message indicating availability of a broadcast message carrying emergency information; receiving the broadcast message, the broadcast message comprising an indicator identifying that the emergency information is for unmanned aerial vehicles; decoding the emergency information to obtain emergency instructions based at least in part on the indicator identifying that the emergency information is for unmanned aerial vehicles; and performing one or more actions for unmanned aerial vehicles based at least in part on the emergency instructions.

Aspect 2: The method of aspect 1, wherein the broadcast message further comprises an indication of a geodetic 2D area or a geodetic 3D volume and further comprising: determining whether the aerial UE is inside the geodetic 2D area or the geodetic 3D volume; ignoring the broadcast message when the aerial UE is determined to be not inside the geodetic 2D area or the geodetic 3D volume; and performing the one or more actions for unmanned aerial vehicles when the aerial UE is determined to be inside the geodetic 2D area or the geodetic 3D volume.

Aspect 3: The method of any of aspects 1 through 2, wherein the emergency instructions comprise an identifier of the one or more actions.

Aspect 4: The method of any of aspects 1 through 3, wherein the emergency instructions comprise an indicator of one or more parameters for the one or more actions to be performed by the aerial UE.

Aspect 5: The method of aspect 4, wherein the indicator of the one or more parameters for the one or more actions to be performed by the aerial UE comprises an action string.

Aspect 6: The method of any of aspects 1 through 5, further comprising: transmitting, to the base station, a response message in response to receiving the broadcast message and subsequent to performing the one or more actions, wherein the received broadcast message comprises an indicator that the aerial UE is to transmit the response message.

Aspect 7: The method of aspect 6, wherein the response message includes a current location of the aerial UE, a confirmation of the performing of the one or more actions, an identification of the aerial UE, or any combination thereof.

Aspect 8: The method of any of aspects 1 through 7, wherein the indicator comprises a message identifier of the broadcast message.

Aspect 9: The method of any of aspects 1 through 8, wherein the emergency instructions comprise safe landing geodetic coordinates, flight path maps for the aerial UE, an altitude value, or any combination thereof, for the one or more actions to be performed by the aerial UE.

Aspect 10: The method of any of aspects 1 through 9, wherein. the downlink control information message comprises a short message, and the broadcast message comprises a system information block eight message or a system information block eight message including one or more additional fields associated with unmanned aerial vehicles Aspect 11: The method of any of aspects 1 through 10, wherein the one or more actions comprise an altitude correction, a landing procedure, a warning area exit procedure, a homing procedure, or any combination thereof.

Aspect 12: The method of any of aspects 1 through 11, wherein performing the one or more actions further comprises updating one or more target operations of the aerial UE based at least in part on the emergency instructions.

Aspect 13: A method for wireless communication at a base station, comprising: receiving, from a network node, emergency instructions for unmanned aerial vehicles; transmitting, to an aerial UE, a downlink control information message indicating availability of a broadcast message carrying emergency information; and transmitting, to one or more aerial UEs, the broadcast message comprising an indicator identifying that the emergency information is for the unmanned aerial vehicles, the emergency information indicating the emergency instructions.

Aspect 14: The method of aspect 13, wherein the broadcast message further comprises an indication of a geodetic 2D area or geodetic 3D volume.

Aspect 15: The method of any of aspects 13 through 14, wherein the emergency instructions comprise an identifier of one or more actions.

Aspect 16: The method of any of aspects 13 through 15, wherein the emergency instructions comprise an indicator of one or more parameters for one or more actions to be performed by the one or more aerial UEs.

Aspect 17: The method of aspect 16, wherein the indicator of the one or more parameters for the one or more actions to be performed by the aerial UE comprises an action string.

Aspect 18: The method of any of aspects 13 through 17, further comprising: receiving, from at least one of the one or more aerial UEs, one or more response messages in response to an indicator that the one or more aerial UEs are to transmit the one or more response messages, wherein the transmitted broadcast message comprises the indicator that the one or more aerial UEs are to transmit the one or more response messages.

Aspect 19: The method of aspect 18, wherein the one or more response messages include a current location of the aerial UE, a confirmation of the performing of one or more actions, an identification of the aerial UE, or any combination thereof.

Aspect 20: The method of any of aspects 13 through 19, wherein the indicator comprises a message identifier of the broadcast message.

Aspect 21: An apparatus for wireless communication at an aerial UE, comprising a processor; memory coupled with the processor; and instructions stored in the memory and executable by the processor to cause the apparatus to perform a method of any of aspects 1 through 12.

Aspect 22: An apparatus for wireless communication at an aerial UE, comprising at least one means for performing a method of any of aspects 1 through 12.

Aspect 23: A non-transitory computer-readable medium storing code for wireless communication at an aerial UE, the code comprising instructions executable by a processor to perform a method of any of aspects 1 through 12.

Aspect 24: An apparatus for wireless communication at a base station, comprising a processor; memory coupled with the processor; and instructions stored in the memory and executable by the processor to cause the apparatus to perform a method of any of aspects 13 through 20.

Aspect 25: An apparatus for wireless communication at a base station, comprising at least one means for performing a method of any of aspects 13 through 20.

Aspect 26: A non-transitory computer-readable medium storing code for wireless communication at a base station, the code comprising instructions executable by a processor to perform a method of any of aspects 13 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at an aerial user equipment (UE), comprising:
    receiving, from a base station of a cellular radio access network, a downlink control information message indicating availability of a broadcast message carrying emergency information;
    receiving the broadcast message, the broadcast message comprising an indicator identifying that the emergency information is for unmanned aerial vehicles, wherein the broadcast message further comprises an indication of a geodetic 2D area or a geodetic 3D volume;
    determining whether the aerial UE is inside the geodetic 2D area or the geodetic 3D volume;
    ignoring the broadcast message if the aerial UE is determined to be not inside the geodetic 2D area or the geodetic 3D volume;
    decoding the emergency information to obtain emergency instructions based at least in part on the indicator identifying that the emergency information is for unmanned aerial vehicles; and
    performing one or more actions for unmanned aerial vehicles based at least in part on the emergency instructions.

2. The method of claim 1, wherein the emergency instructions comprise an identifier of the one or more actions.

3. The method of claim 1, wherein the emergency instructions comprise an indicator of one or more parameters for the one or more actions to be performed by the aerial UE.

4. The method of claim 3, wherein the indicator of the one or more parameters for the one or more actions to be performed by the aerial UE comprises an action string.

5. The method of claim 1, further comprising:
    transmitting, to the base station, a response message in response to receiving the broadcast message and subsequent to performing the one or more actions, wherein the received broadcast message comprises an indicator that the aerial UE is to transmit the response message.

6. The method of claim 5, wherein the response message includes a current location of the aerial UE, a confirmation of the performing of the one or more actions, an identification of the aerial UE, or any combination thereof.

7. The method of claim 1, wherein the indicator comprises a message identifier of the broadcast message.

8. The method of claim 1, wherein the emergency instructions comprise safe landing geodetic coordinates, flight path maps for the aerial UE, an altitude value, or any combination thereof, for the one or more actions to be performed by the aerial UE.

9. The method of claim 1, wherein
    the downlink control information message comprises a short message, and
    the broadcast message comprises a system information block eight message including one or more fields associated with unmanned aerial vehicles.

10. The method of claim 1, wherein the one or more actions comprise an altitude correction, a landing procedure, a warning area exit procedure, a homing procedure, or any combination thereof.

11. The method of claim 1, wherein performing the one or more actions further comprises updating one or more target operations of the aerial UE based at least in part on the emergency instructions.

12. A method for wireless communication at a base station, comprising:
    receiving, from a network node, emergency instructions for unmanned aerial vehicles;
    transmitting, to an aerial user equipment (UE), a downlink control information message indicating availability of a broadcast message carrying emergency information; and
    transmitting, to one or more aerial UEs, the broadcast message comprising an indicator identifying that the emergency information is for the unmanned aerial vehicles, the emergency information indicating the emergency instructions, wherein the broadcast message further comprises an indication of a geodetic 2D area or a geodetic 3D volume to enable the UE to determine whether the aerial UE is inside the geodetic 2D area or the geodetic 3D volume and to ignore the broadcast message if the aerial UE is determined to be not inside the geodetic 2D area or the geodetic 3D volume.

13. The method of claim 12, wherein the emergency instructions comprise an identifier of one or more actions.

14. The method of claim 12, wherein the emergency instructions comprise an indicator of one or more parameters for one or more actions to be performed by the one or more aerial UEs.

15. The method of claim 14, wherein the indicator of the one or more parameters for the one or more actions to be performed by the aerial UE comprises an action string.

16. The method of claim 12, further comprising:
    receiving, from at least one of the one or more aerial UEs, one or more response messages in response to an indicator that the one or more aerial UEs are to transmit the one or more response messages, wherein the transmitted broadcast message comprises the indicator that the one or more aerial UEs are to transmit the one or more response messages.

17. The method of claim 16, wherein the one or more response messages include a current location of the aerial UE, a confirmation of the performing of one or more actions, an identification of the aerial UE, or any combination thereof.

18. The method of claim 12, wherein the indicator comprises a message identifier of the broadcast message.

19. An apparatus for wireless communication at an aerial user equipment (UE), comprising:
a processor;
memory coupled with the processor; and
instructions stored in the memory and executable by the processor to cause the apparatus to:
receive, from a base station of a cellular radio access network, a downlink control information message indicating availability of a broadcast message carrying emergency information;
receive the broadcast message, the broadcast message comprising an indicator identifying that the emergency information is for unmanned aerial vehicles, wherein the broadcast message further comprises an indication of a geodetic 2D area or a geodetic 3D volume;
determine whether the aerial UE is inside the geodetic 2D area or the geodetic 3D volume;
ignore the broadcast message if the aerial UE is determined to be not inside the geodetic 2D area or the geodetic 3D volume;
decode the emergency information to obtain emergency instructions based at least in part on the indicator identifying that the emergency information is for unmanned aerial vehicles; and
perform one or more actions for unmanned aerial vehicles based at least in part on the emergency instructions.

20. The apparatus of claim 19, wherein the emergency instructions comprise an identifier of the one or more actions.

21. The apparatus of claim 19, wherein the emergency instructions comprise an indicator of one or more parameters for the one or more actions to be performed by the aerial UE.

22. The apparatus of claim 19, wherein the instructions are further executable by the processor to cause the apparatus to:
transmit, to the base station, a response message in response to receiving the broadcast message and subsequent to performing the one or more actions, wherein the received broadcast message comprises an indicator that the aerial UE is to transmit the response message.

23. An apparatus for wireless communication at a base station, comprising:
a processor;
memory coupled with the processor; and
instructions stored in the memory and executable by the processor to cause the apparatus to:
receive, from a network node, emergency instructions for unmanned aerial vehicles;
transmit, to an aerial user equipment (UE), a downlink control information message indicating availability of a broadcast message carrying emergency information; and
transmit, to one or more aerial UEs, the broadcast message comprising an indicator identifying that the emergency information is for the unmanned aerial vehicles, the emergency information indicating the emergency instructions, wherein the broadcast message further comprises an indication of a geodetic 2D area or a geodetic 3D volume to enable the UE to determine whether the aerial UE is inside the geodetic 2D area or the geodetic 3D volume and to ignore the broadcast message if the aerial UE is determined to be not inside the geodetic 2D area or the geodetic 3D volume.

24. The apparatus of claim 23, wherein the emergency instructions comprise an identifier of one or more actions.

25. The apparatus of claim 23, wherein the emergency instructions comprise an indicator of one or more parameters for one or more actions to be performed by the one or more aerial UEs.

26. The apparatus of claim 23, wherein the instructions are further executable by the processor to cause the apparatus to:
receive, from at least one of the one or more aerial UEs, one or more response messages in response to an indicator that the one or more aerial UEs are to transmit the one or more response messages, wherein the transmitted broadcast message comprises the indicator that the one or more aerial UEs are to transmit the one or more response messages.

* * * * *